United States Patent
Sugita et al.

(10) Patent No.: US 9,928,411 B2
(45) Date of Patent: Mar. 27, 2018

(54) IMAGE PROCESSING APPARATUS, IMAGE PROCESSING SYSTEM, IMAGE PROCESSING METHOD, AND COMPUTER PROGRAM PRODUCT

(71) Applicant: KABUSHIKI KAISHA TOSHIBA, Minato-ku, Tokyo (JP)

(72) Inventors: Kaoru Sugita, Tokyo (JP); Masahiro Sekine, Tokyo (JP); Masashi Nishiyama, Kanagawa (JP); Ryuzo Okada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 492 days.

(21) Appl. No.: 14/628,486

(22) Filed: Feb. 23, 2015

(65) Prior Publication Data

US 2015/0248583 A1    Sep. 3, 2015

(30) Foreign Application Priority Data

Mar. 3, 2014 (JP) .................................. 2014-040875
Jan. 15, 2015 (JP) .................................. 2015-006080

(51) Int. Cl.
*G06F 19/00* (2011.01)
*G06K 9/00* (2006.01)
(Continued)

(52) U.S. Cl.
CPC ............ *G06K 9/00369* (2013.01); *G06T 7/75* (2017.01); *G06T 19/00* (2013.01);
(Continued)

(58) Field of Classification Search
CPC ....... G06K 9/00369; G06T 7/75; G06T 19/00; G06T 2207/30196; G06T 2210/16
(Continued)

(56) References Cited

U.S. PATENT DOCUMENTS 6,546,309 B1 *  4/2003  Gazzuolo ........... G06Q 30/0601
                                                         33/512
7,617,016 B2 * 11/2009  Wannier ................. A41H 3/007
                                                         700/132

(Continued)

FOREIGN PATENT DOCUMENTS

JP    2003-288505    10/2003
JP    2006-249618     9/2006

(Continued)

*Primary Examiner* — Nathan Durham
(74) *Attorney, Agent, or Firm* — Nixon & Vanderhye, P.C.

(57) ABSTRACT

According to an embodiment, a first acquirer of an image processing apparatus acquires a subject image of a first subject. A second acquirer acquires a first parameter representing a body type of the first subject. A receiver receives identification information on clothing to be tried on. An identifier identifies a clothing image associated with a second parameter of which dissimilarity with the first parameter is not larger than a threshold, from among clothing images associated with the received identification information in first information in which clothing sizes, second parameters, and clothing images are associated with each piece of identification information. The second parameters corresponds to each clothing size and represents different body types. The clothing images each represents a second subject who has a body type represented by the corresponding second parameter associated with the corresponding clothing size and who is wearing the piece of clothing in each clothing size.

20 Claims, 18 Drawing Sheets

(51) Int. Cl.
  *G06T 19/00* (2011.01)
  *G06T 7/73* (2017.01)
  *H04N 7/18* (2006.01)

(52) U.S. Cl.
  CPC .................. *G06T 2207/30196* (2013.01);
      *G06T 2210/16* (2013.01); *H04N 7/18*
      (2013.01)

(58) Field of Classification Search
  USPC ............................................... 700/130–133
  See application file for complete search history.

(56) References Cited

U.S. PATENT DOCUMENTS

| | | | |
|---|---|---|---|
| 2001/0026272 A1* | 10/2001 | Feld ...................... | A41H 3/007 345/419 |
| 2002/0103566 A1* | 8/2002 | Gadson ................. | G06Q 30/06 700/132 |
| 2002/0138170 A1* | 9/2002 | Onyshkevych ........ | G06Q 30/06 700/130 |
| 2004/0078285 A1* | 4/2004 | Bijvoet .................. | A41H 3/007 700/132 |
| 2006/0202986 A1 | 9/2006 | Okada et al. | |
| 2006/0287877 A1* | 12/2006 | Wannier ............. | G06Q 30/0601 700/132 |
| 2007/0005174 A1* | 1/2007 | Thomas ................ | G06Q 30/02 700/132 |
| 2007/0233311 A1 | 10/2007 | Okada et al. | |
| 2008/0255920 A1* | 10/2008 | Vandergriff ............ | G06Q 30/06 700/132 |
| 2008/0312765 A1* | 12/2008 | Gardiner ................ | A41H 1/00 700/132 |
| 2013/0108121 A1 | 5/2013 | De Jong | |
| 2013/0179288 A1 | 7/2013 | Moses et al. | |

FOREIGN PATENT DOCUMENTS

| | | |
|---|---|---|
| JP | 2010-084263 | 4/2010 |
| JP | 2013-526735 | 6/2013 |
| JP | 2013-186490 | 9/2013 |

\* cited by examiner

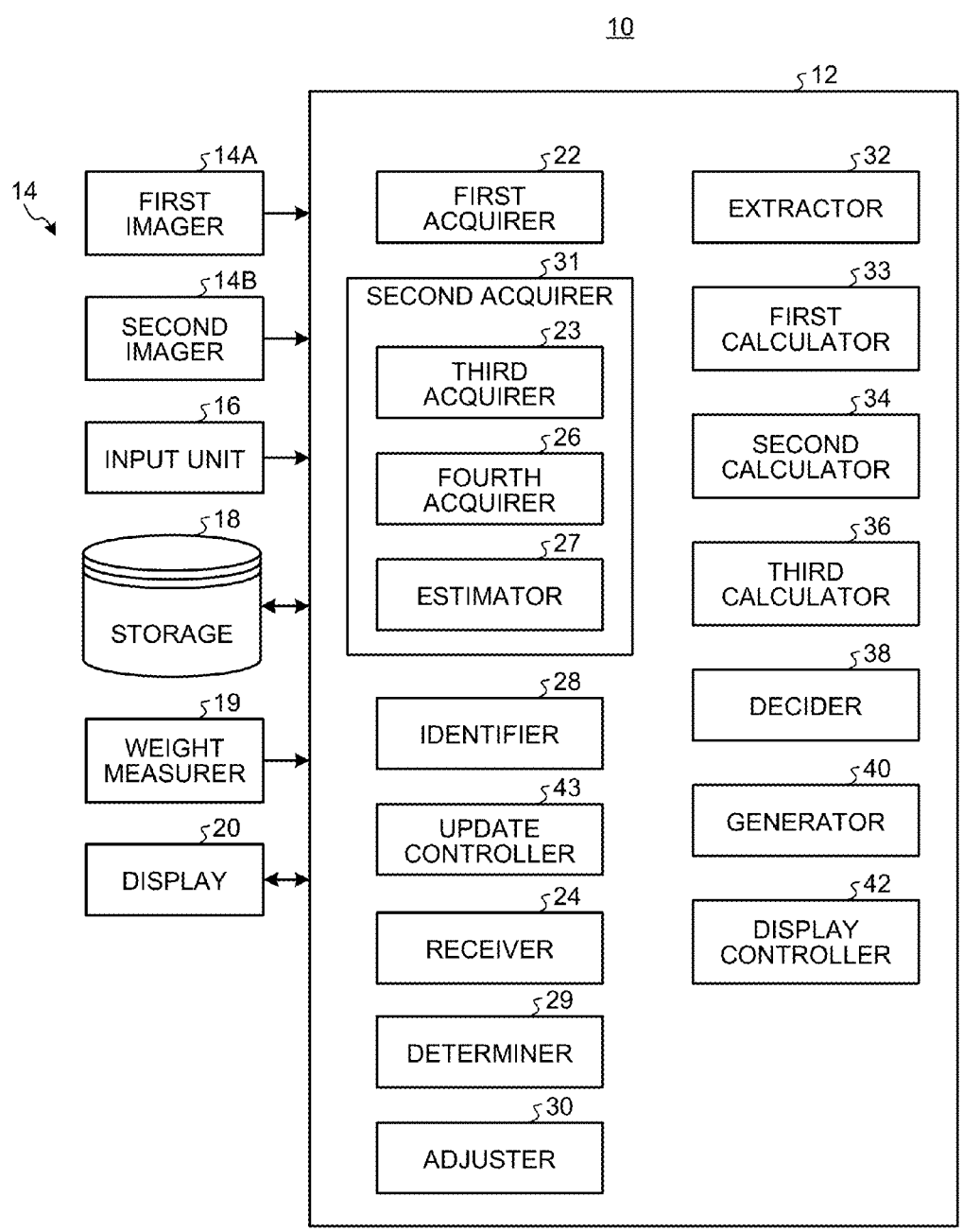

FIG.3

| CLOTH-ING TYPE | CLOTH-ING ID | CLOTH-ING SIZE | SECOND BODY TYPE PARAMETER | MODEL ID | POSTURE INFOR-MATION | CLOTH-ING IMAGE | ATTRIBUTE INFOR-MATION |
|---|---|---|---|---|---|---|---|
| UPPER GAR-MENTS | | S | | | | | |
| | | M | | | | | |
| | | L | | | | | |
| | | LL | | | | | |
| OUTER-WEAR | | | | | | | |

FIG.5

| CLOTHING ID | PARAMETER | WEIGHTING VALUE |
|---|---|---|
| | CHEST CIRCUMFERENCE | 1 |
| | WAIST CIRCUMFERENCE | 1 |
| | HIP CIRCUMFERENCE | 1 |
| | SHOULDER WIDTH | 1 |
| | HEIGHT | 0.5 |
| | WEIGHT | 1 |
| ⋮ | ⋮ | |
| ⋮ | ⋮ | |
| ⋮ | ⋮ | |

FIG.6

| CLOTHING TYPE | PARAMETER | | | | |
|---|---|---|---|---|---|
| | CHEST CIRCUMFERENCE | WAIST CIRCUMFERENCE | HIP CIRCUMFERENCE | SHOULDER WIDTH | HEIGHT |
| OUTERWEAR | ○ | ○ | ○ | ○ | |
| UPPER GARMENTS | ○ | ○ | ○ | ○ | |
| PANTS | | ○ | ○ | | ○ |
| SKIRTS | | ○ | ○ | | |

CLOTHING IMAGE

IMAGE PROCESSING APPARATUS, IMAGE PROCESSING SYSTEM, IMAGE PROCESSING METHOD, AND COMPUTER PROGRAM PRODUCT

CROSS-REFERENCE TO RELATED APPLICATIONS

This application is based upon and claims the benefit of priority from Japanese Patent Application No. 2014-040875, filed on Mar. 3, 2014, and Application No. 2015-006080, filed on Jan. 15, 2015; the entire contents of which are incorporated herein by reference.

FIELD

Embodiments described herein relate generally to an image processing apparatus, an image processing system, an image processing method, and a computer program product.

BACKGROUND

Various technologies for displaying a virtual image of a subject trying on a piece of clothing have been disclosed. For example, a technology for displaying a synthetic image of a first subject trying on a piece of clothing has been disclosed.

Conventionally practiced is synthesizing an image of a piece of ready-made clothing in a size prepared in advance with an image of a first subject whatever the body type of the first subject is. It has been therefore difficult to provide images representing the first subject actually wearing pieces of clothing in different sizes.

BRIEF DESCRIPTION OF THE DRAWINGS

FIG. 1 is a block diagram illustrating a functional configuration of an image processing system;

FIG. 3 is a schematic of an exemplary data structure of first information;

FIG. 5 is a schematic of an exemplary data structure of second information;

FIG. 6 is a schematic of an exemplary data structure of third information;

DETAILED DESCRIPTION

Figure 2A:
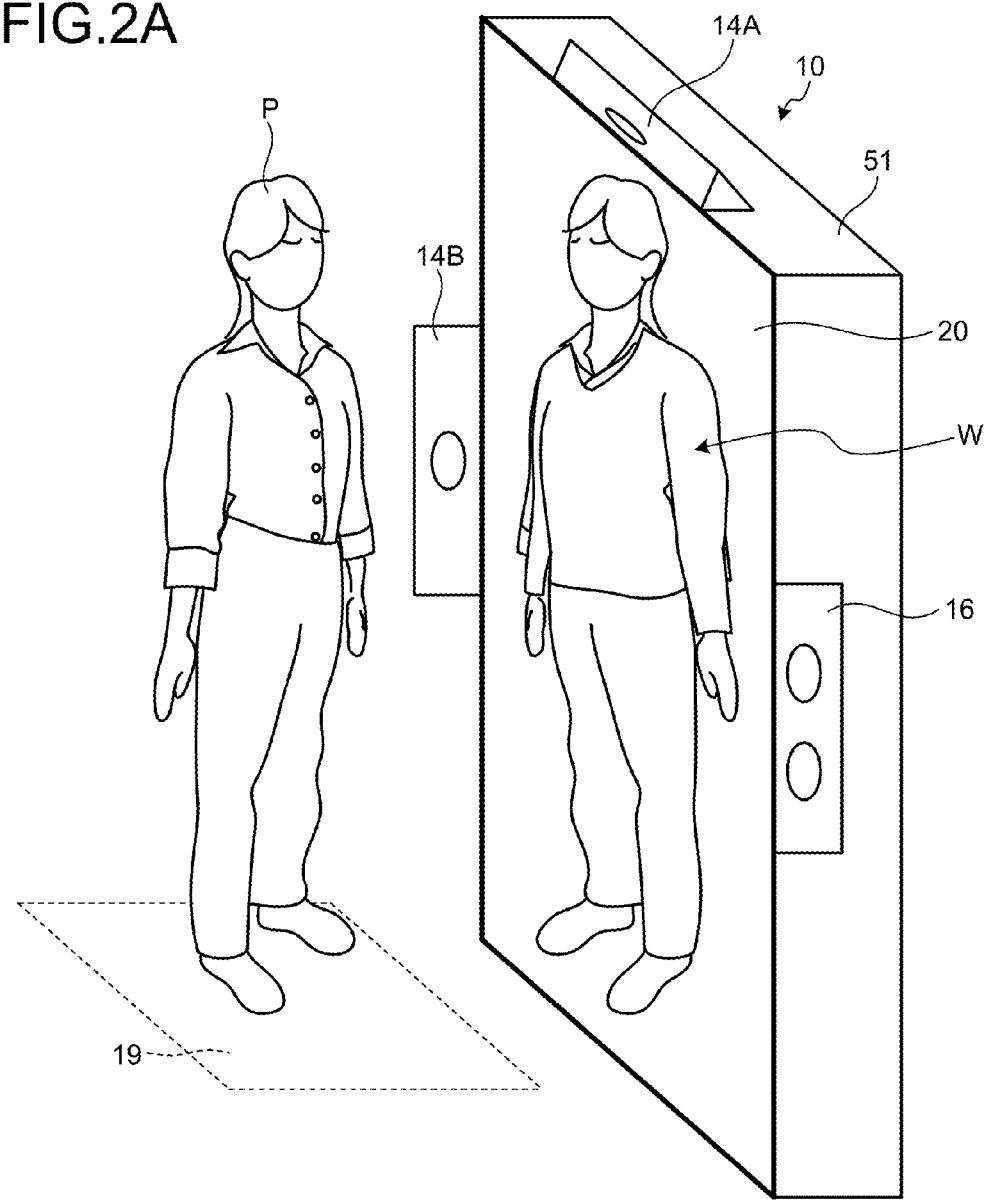
FIGS. 2A and 2B are schematics of external views of the image processing system.

According to an embodiment, an image processing apparatus includes a first acquirer, a second acquirer, a receiver, and an identifier. The first acquirer acquires a subject image of a first subject. The second acquirer acquires a first body type parameter representing a body type of the first subject. The receiver receives identification information on a piece of clothing to be tried on. The identifier identifies, as a clothing image to be output, a clothing image associated with a second body type parameter of which dissimilarity with the first body type parameter is equal to or lower than a threshold, from among a plurality of clothing images associated with the received identification information in first information in which a plurality of clothing sizes, a plurality of second body type parameters, and a plurality of clothing images are associated with each of pieces of identification information on pieces of clothing. The second body type parameters corresponds to each of the clothing sizes and representing different body types. The clothing images each represents a second subject who has a body type represented by the corresponding second body type parameter that is associated with the corresponding clothing size and who is wearing the piece of clothing in each of the clothing sizes.

Various embodiments will now be explained in detail with reference to the accompanying drawings.

First Embodiment

FIG. 1 is a block diagram illustrating a functional configuration of an image processing system 10 according to a first embodiment. The image processing system 10 includes an image processing apparatus 12, first and second imagers 14A and 14B (hereinafter, collectively referred to as a imager 14), an input unit 16, a storage 18, a weight measurer 19, and a display 20. The imager 14, the input unit 16, the storage 18, the weight measurer 19, and the display 20 are connected to the image processing apparatus 12 in a manner enabling signals to be exchanged.

In the image processing system 10 according to the first embodiment, the image processing apparatus 12 is separately provided from the imager 14, the input unit 16, the storage 18, the weight measurer 19, and the display 20. In the image processing system 10, however, the image processing apparatus 12 may be integrated with at least one of the imager 14, the input unit 16, the storage 18, the weight measurer 19, and the display 20.

The first imager 14A captures and acquires an image of a first subject. The first imager 14A captures an image of the first subject once in every given interval. The first imager 14A outputs captured subject images successively to the image processing apparatus 12. By causing the first imager 14A to capture images of the first subject successively and to output the images successively to the image processing apparatus 12, the image processing apparatus 12 may acquire a moving image including a plurality of subject images captured at different time.

The first subject is a subject who is to try on a piece of clothing. The first subject may be any subject who is to try on a piece of clothing, and may be a living or non-living thing. A living thing may be a person, as an example, as well as a pet such as a dog or a cat. A non-living thing may be a mannequin in a shape of a human or a pet, a piece of clothing, or any other objects without limitation. The first subject may be a living thing or a non-living thing wearing a piece of clothing.

A piece of clothing is an item that can be worn by a first subject. Examples of the clothing include a jacket, a skirt, a pair of trousers, shoes, and a hat, but clothing is not limited to a jacket, a skirt, a pair of trousers, shoes, and a hat.

A subject image is a bit map image. A subject image is a subject image of which each pixel is specified with a pixel value indicating a color or luminance. The first imager 14A is a known camera device capable of capturing an image of a subject.

The second imager 14B acquires a depth map by capturing an image.

A depth map is sometimes referred to as a distance image. A depth map is an image of which each pixel is specified with a distance from the second imager 14B. In the first embodiment, the depth map may be created by applying a known process such as stereo matching to a subject image, or may be acquired by causing the second imager 14B to capture an image in the same conditions as those in which the subject image is captured. Any known camera device capable of acquiring a depth map may be used as the second imager 14B.

In the first embodiment, the first imager 14A and the second imager 14B capture images of the first subject at the same timing. The first imager 14A and the second imager 14B are controlled by a controller not illustrated, for example, so as to capture images successively and synchronously at the same timing. The imager 14 then successively outputs the subject images of the first subject and the depth maps acquired by capturing images to the image processing apparatus 12.

The display 20 is a device for displaying various images. The display 20 is a display device such as a liquid crystal display (LCD). In the first embodiment, the display 20 displays a synthetic image described later generated by the image processing apparatus 12. The image processing system 10 may further include a printing unit for printing the synthetic image, or a transmitting unit for transmitting the synthetic image to an external device over a network.

The input unit 16 receives user inputs. In the first embodiment, a term "user" generally refers to any operator including a first subject and a second subject. The first subject and the second subject will be described later in detail.

The input unit 16 is means for allowing users to make various operational inputs. Examples of the input unit 16 include one or any combination of a mouse, a button, a remote controller, a keyboard, a voice recognition device such as a microphone, and an image recognition device. When an image recognition device is used as the input unit 16, the device may receive gestures of users facing the input unit 16 as various user instructions. In such a configuration, instruction information corresponding to movements such as gestures is stored in advance in the image recognition device, and the image recognition device may read the instruction information corresponding to a recognized gesture, and accept the user operation instruction.

The input unit 16 may also be a communication device for receiving a signal indicating a user operation instruction from an external device such as a mobile terminal that transmits various types of information. In such a configuration, the input unit 16 may receive a signal indicating an operation instruction from the external device, as an operation instruction issued by a user.

The input unit 16 may be integrated with the display 20. Specifically, the input unit 16 and the display 20 may be provided as a user interface (UI) having an input function and a display function. An example of such an UI includes an LCD with a touch panel.

The weight measurer 19 is a known instrument for measuring the weight of the first subject. When the first subject gets on top of the weight measurer 19, for example, the weight measurer 19 is caused to measure the weight of the first subject. The weight measurer 19 then outputs the weight that is a measurement result to the image processing apparatus 12.

Figure 2B:
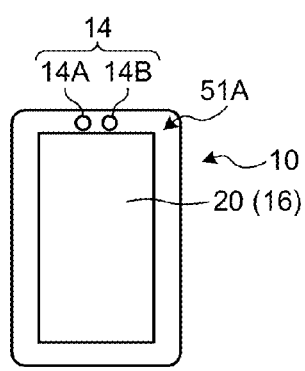

FIGS. 2A and 2B are schematics of external views of the image processing system 10.

As illustrated in FIG. 2A, the display 20 in the image processing system 10 is embedded on one side of a rectangular housing 51, for example. The image processing apparatus 12 (see FIG. 1) is provided internal of the housing 51. In the image processing system 10, a synthetic image W presenting an image of a first subject P trying on various pieces of clothing is displayed on the display 20. The first subject P such as a person sees the synthetic image W displayed on the display 20, for example, from the position facing the display 20. The weight measurer 19 is provided on the floor of an area facing the display 20. When the first subject P comes to the position facing the display 20, the weight measurer 19 measures the weight of the first subject P.

The housing 51 supports the input unit 16 and the imager 14 (the first imager 14A and the second imager 14B). In the example illustrated in FIG. 2A, the input unit 16 and the first imager 14A are provided at respective ends of the display 20 of the housing 51 in the horizontal direction. The second imager 14B is provided on top of the display 20 in the housing 51. The position at which the input unit 16 is installed is not limited thereto. The first imager 14A and the second imager 14B may also be provided any positions capable of capturing images of the first subject P, without limitation to the examples explained above.

The image processing system 10 may be a mobile terminal, as illustrated in FIG. 2B. In such a configuration, a housing 51A of the image processing system 10 configured as a mobile terminal is provided with a UI having the functions of the display 20 and the input unit 16, the first imager 14A, and the second imager 14B. The image processing apparatus 12 (see FIG. 1) is provided internal of the housing 51A.

In response to a user making operation instructions on the input unit 16, various types of information are input via the input unit 16. The first imager 14A and the second imager 14B successively capture the images of the first subject P synchronously at the same timing, as mentioned earlier. The first imager 14A and the second imager 14B then outputs the captured subject images and depth maps successively to the image processing apparatus 12.

Referring back to FIG. 1, the storage 18 stores therein various types of data. In the first embodiment, first information, second information, third information, and fourth information are stored in the storage 18 in advance.

The first information is a piece of information in which a plurality of clothing sizes, a plurality of second body type parameters associated with each of the clothing sizes and representing different body types, a plurality of clothing images of second subjects with the body types represented by the respective second body type parameters and wearing the clothing in the corresponding clothing size are associated with each piece of clothing identification information. Hereinafter, the clothing identification information is sometimes referred to as a clothing ID.

The second subject is the subject who is wearing the piece of clothing when a clothing image included in the first information is captured. The second subject may be any subject wearing a piece of clothing, and may be a living thing such as a person, or a non-living thing such as a mannequin in the shape of a human, in the same manner as the first subject.

FIG. 3 is a schematic of an exemplary data structure of the first information.

In the example illustrated in FIG. 3, the first information is information in which clothing types, clothing IDs, clothing sizes, second body type parameters, model IDs, posture information, clothing images, and attribute information are associated with one another.

A clothing type specifies a type of clothing into which a piece of clothing is classified, when the clothing is classified into a plurality of types with predetermined classification conditions. Examples of a clothing type include upper garments, outerwear, and lower garments, but without limitation.

The clothing ID (clothing identification information) is a piece of information for identifying a piece of clothing. A piece of clothing specifically means a piece of ready-made clothing. Examples of a clothing ID include a product number and a clothing name, but without limitation. As the product number, known Japanese Article Number (JAN) code is used, for example. As the name, the product name of the piece of clothing is used, for example.

The clothing size is a piece of information indicating a size of a piece of clothing. The clothing size is, for example, the size of a piece of ready-made clothing, such as S, M, L, LL, or XL. The type of the clothing size is not limited to this example. The type of clothing size is, for example, indicated differently depending on the country in which the ready-made clothing is manufactured or sold.

The second body type parameter is a piece of information indicating the body type of the second subject. The second body type parameter may include one or more parameters. The parameter is a measurement of one or more locations of a human body. The measurement is not limited to an actual measurement, and may also include an estimation of a measurement and any other value corresponding to the measurement (e.g., any value entered by a user).

In the first embodiment, a parameter is a measurement corresponding to each part of the human body measured before a piece of clothing is tailored or purchased, or the weight, for example. Specifically, the second body type parameter includes at least one parameter of a chest circumference, a waist circumference, a hip circumference, a height, a shoulder width, and a weight. The second body type parameter is not limited to these listed above. For example, the second body type parameter may further include a sleeve length and an inseam, for example.

In the first information, a clothing size is associated in advance with a plurality of second body type parameters representing different body types. In other words, in the first information, each of clothing sizes of a clothing ID is associated with a plurality of second body type parameters representing different body types.

Users of the same or approximately the same body type may wear different sizes of clothing, such as "S", "M", "L", or "LL". In other words, the size of clothing worn by a user of a certain body type is not limited to one, and a user might wear a piece of clothing in different sizes depending on the styles or the types of clothing.

To address this issue, in the first embodiment, in the first information, each of clothing sizes of a clothing ID is associated with a plurality of second body type parameters representing different body types in advance.

The model ID is a piece of identification information identifying the second subject having a body type represented by the corresponding second body type parameter.

A clothing image is an image of which each pixel is specified with a pixel value indicating a color, luminance, or the like of the clothing. The first information includes a clothing image corresponding to a second body type parameter. In other words, in the first information, a plurality of second body type parameters representing different body types are associated with each of the clothing sizes that are associated with a clothing ID, and a clothing image is associated with each of the second body type parameters.

A clothing image is an image of a second subject who has a body type represented by the corresponding second body type parameter and who is wearing a piece of clothing in the corresponding clothing size, the clothing size and the second body type parameter being those with which the clothing image is associated in the first information. In other words, the clothing images associated with the respective body type parameters that are associated with one of the clothing sizes are the images of a plurality of second subjects with different body types, represented by the respective second body parameters, wearing a piece of clothing in the same size.

The posture information is a piece of information indicating the posture of the second subject at the time when the clothing image is captured. The posture information indicates the orientation, the movement, and the like of the second subject with respect to the camera device 14.

An orientation of the second subject indicates an orientation of the second subject wearing the clothing captured in the clothing image, with respect to the camera device 14 at the time when the clothing image is captured. Examples of the orientation of the second subject include a front direction in which the face and the body face the front side with respect to the camera device 14, a side direction in which the face and the body face sideway with respect to the camera device 14, and any other directions other than the front direction and the side direction.

A movement of the second subject is indicated by skeletal information representing the position of the skeleton of the second subject who is wearing the clothing captured in the clothing image. The skeletal information is a piece of information specified for each pixel with information indicating the position of the skeleton of the second subject who is wearing the clothing in the clothing image, corresponding to the pixel position of each pixel in the clothing image. In the first embodiment, the posture information includes the orientation and the skeletal information on the second subject.

In the first embodiment, the first information includes a plurality of clothing images corresponding to different posture information, as clothing images corresponding to the second body type parameters.

In other words, in the first embodiment, a clothing image is an image of a second subject who is wearing a piece of clothing in a particular size and whose body type is represented by the corresponding second body type parameter, and who is at the posture of the time when the image of the second subject is captured.

The attribute information is a piece of information indicating an attribute of a piece of clothing identified by the corresponding clothing ID. Examples of the attribute information include the name, the manufacturer (e.g., brand name), the shape, the color, the materials, and the price of the clothing.

The first information may be any information in which at least clothing IDs, clothing sizes, second body type parameters, and clothing images are associated with one another. In other words, the first information may not include at least one of the clothing types, the model IDs, the posture information, and the attribute information.

The first information may be a piece of information in which ways in which the clothing is worn (e.g., with and without buttons closed) is further associated. In this case, the first information may store, as clothing images corresponding to a piece of posture information, a plurality of clothing images corresponding to the respective ways in which the clothing is worn.

Figure 4:
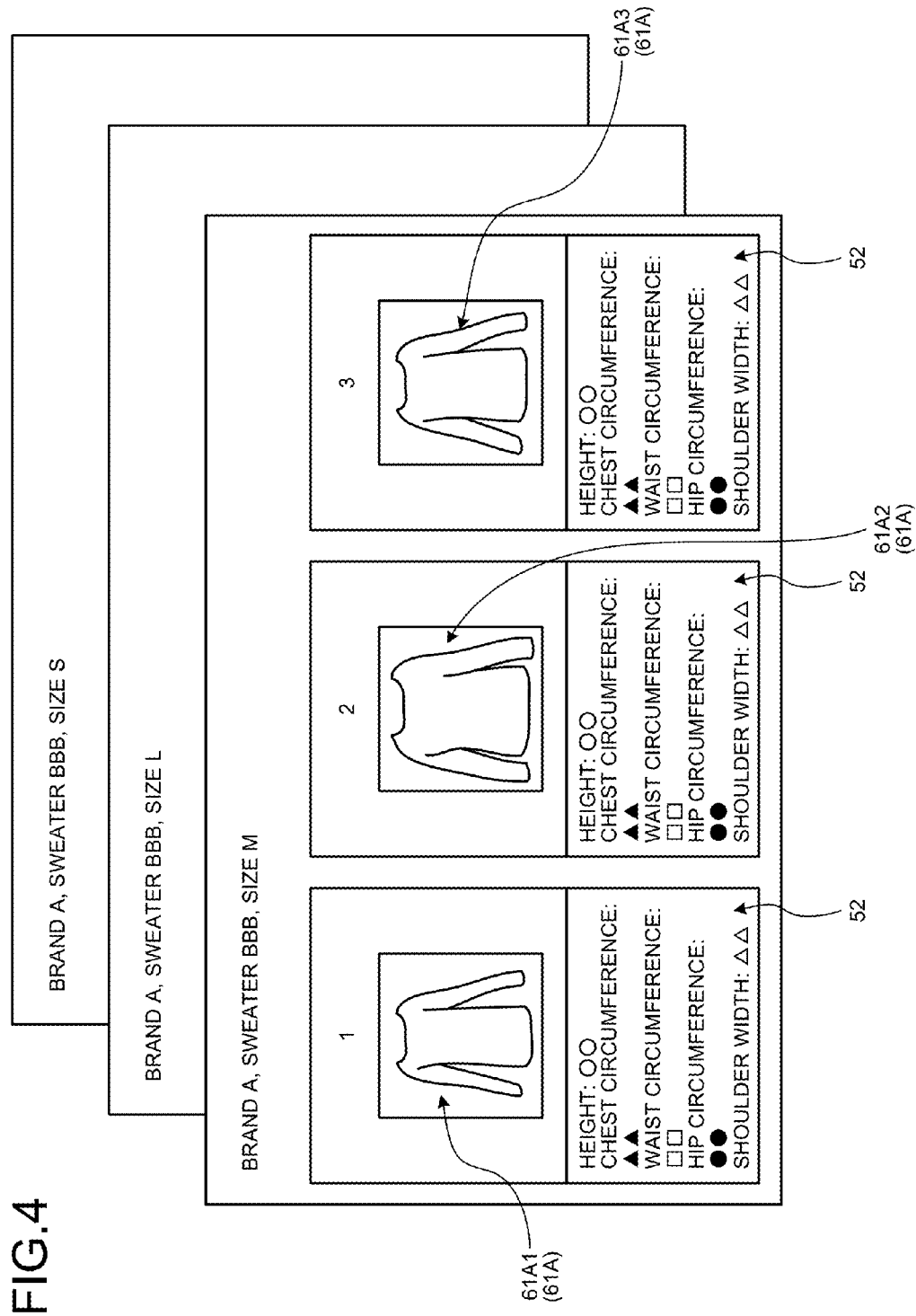
FIG. 4 is a schematic specifically illustrating the first information.

FIG. 4 is a schematic specifically illustrating the first information. As illustrated in FIG. 4, the first information includes clothing images corresponding to respective sets of second body type parameters (see reference numerals 52 in FIG. 4). In other words, in the first information, each of the sizes (M size, L size, and S size) of a piece of clothing identified by a clothing ID (a sweater BBB of a brand A) is associated with a plurality of sets of the second body type parameters each representing a different body type. In the first information, clothing images 61A (clothing images 61A1 to 61A3) are also associated with the respective sets of the second body type parameters. In the example illustrated in FIG. 4, the second body type parameter includes a height, a chest circumference, a waist circumference, a hip circumference, and a shoulder width as a parameter set.

In other words, the clothing images 61A1 to 61A3 are the images of the respective second subjects with different body types wearing the same piece of clothing (the sweater BBB of the brand A) in the same size (in FIG. 4, an M size).

Referring back to FIG. 1, the storage 18 also stores therein the second information, the third information, and the fourth information, as mentioned earlier.

FIG. 5 is a schematic of an exemplary data structure of the second information. The second information is a piece of information in which clothing IDs, parameters representing body types, and weighting values are associated with one another. The body type parameters are the same as those included in the second body type parameter. The weighting value indicates a degree by which the appearance is influenced by the corresponding parameter when a subject wears the piece of clothing identified by the clothing ID. A smaller weighting value indicates that the parameter influences the appearance less when the subject wears the clothing. A larger weighting value indicates that the parameter influences the appearance more when the subject wears the clothing. The image processing apparatus 12 uses this weighting value in calculating dissimilarity, which is described later in detail. The second information may also be a piece of information in which clothing types are further associated.

For example, it is assumed that the parameters other than the height affect the appearance of the subject wearing the piece of clothing identified by a clothing ID more than the height. In this case, the image processing apparatus 12 establishes the second information by setting a relatively lower weighting value (a value less than one in FIG. 5) to the height than those set for the other parameters for the clothing ID.

If the clothing type corresponding to the clothing ID is "upper garments", for example, the appearance of a subject wearing the piece of clothing is less affected by the parameters corresponding to the lower part of a human body. The image processing apparatus 12 then establishes second information by setting relatively lower weighting values to the hip circumference parameter and the height parameter for the clothing ID with the clothing type "upper garments" than those set for the other parameters.

The weighting values corresponding to the respective parameters associated with each of the clothing IDs can be modified as appropriate by users making operation instructions on the input unit 16. Users may enter and register, in advance, the weighting values for the respective parameters for each piece of clothing identified by a clothing ID to the second information.

FIG. 6 is a schematic of an exemplary data structure of the third information. The third information is a piece of information in which clothing types are associated with the parameters used in dissimilarity calculation. Alternatively, the third information may be a piece of information in which clothing IDs are associated with the parameters used in the dissimilarity calculation. Still alternatively, the third information may be a piece of information in which clothing images are associated with the parameters used in the dissimilarity calculation. The dissimilarity calculation will be explained later.

The example illustrated in FIG. 6 indicates that, if the clothing type is "outerwear", for example, the chest circumference, the hip circumference, the waist circumference, and the shoulder width, among those specified in the third information, are used, but the height is not used in the dissimilarity calculation. The example illustrated in FIG. 6 also indicates that, if the clothing type is "skirts", the waist circumference and the hip circumference parameters, among those specified in the third information, are used, but the chest circumference, the shoulder width, and the height are not used in the dissimilarity calculation.

The third information may be a piece of information in which parameters that are specific to a clothing type or a clothing ID are further associated. For example, when the clothing type is upper garments or outerwear, the third information may also include a sleeve length as a corresponding parameter. If the clothing type is pants, for example, the third information may also include an inseam as a corresponding parameter.

The fourth information (not illustrated) is a piece of information in which a clothing ID is associated with a correction value. A correction value is used in correcting a first body type parameter, which is described later. When a piece of clothing identified by a corresponding clothing ID hides a body more, the image processing apparatus 12 sets a smaller correction value that is equal to or more than "zero" and less than "one" to the clothing ID in advance. Using a correction value of "one" for a piece of clothing identified by a corresponding clothing ID and hiding a body by the least degree, the image processing apparatus 12 sets a correction value nearer to "one", when such a degree is lower, in advance.

For example, when a piece of clothing identified by a clothing ID is a piece of clothing closely fitted to a body, such as a T-shirt or underwear, a correction value of "one" or near "one" is set for the corresponding clothing ID in the fourth information in advance. By contrast, when the clothing identified by a clothing ID is a piece of clothing hiding a body by a larger degree, e.g., a thick sweater or coat, a correction value nearer to zero within a range equal to or more than "zero" and less than "one" (e.g., 0.3) is set for the corresponding clothing ID in the fourth information in advance.

The clothing IDs and the correction values included in the fourth information can be modified as appropriate, by users making operation instructions on the input unit 16.

Referring back to FIG. 1, the image processing apparatus 12 is a computer including a central processing unit (CPU), a read-only memory (ROM), and a random access memory (RAM). The image processing apparatus 12 may include any other circuit other than a CPU.

The image processing apparatus 12 includes a first acquirer 22, a second acquirer 31, a receiver 24, an identifier 28, an update controller 43, a determiner 29, an adjuster 30, an extractor 32, a first calculator 33, a second calculator 34, a third calculator 36, a decider 38, a generator 40, and a display controller 42.

The first acquirer 22, the second acquirer 31, the receiver 24, the identifier 28, the update controller 43, the determiner 29, the adjuster 30, the extractor 32, the first calculator 33, the second calculator 34, the third calculator 36, the decider 38, the generator 40, and the display controller 42 may be implemented entirely or partially by causing a processor such as a CPU to execute a computer program, that is, implemented as software, as hardware such as an integrated circuit (IC), or a combination of software and hardware.

The first acquirer 22 acquires a subject image of a first subject. Specifically, the first acquirer 22 acquires a subject image of the first subject by extracting a person area from the subject image captured by the first imager 14A.

The display controller 42 displays various images on the display 20.

The receiver 24 receives various types of information from the input unit 16.

In the first embodiment, the receiver 24 receives the identification information on a piece of clothing to be tried on (clothing ID) and a clothing size of the piece of clothing to be tried on from the input unit 16. A user, for example, making an operation instruction on the input unit 16 enters attribute information on a piece of clothing (the shape, the name, and the seller (e.g., brand name), a color, the materials, and the price of the clothing) and a clothing size.

The receiver 24 analyzes the attribute information received from the input unit 16, and retrieves a clothing ID of which attribute information matches the received information, from the first information stored in the storage 18. The display controller 42 controls to select a representative clothing image corresponding to each of one or more clothing IDs retrieved by the receiver 24, and to display a list of clothing images on the display 20. In other words, because a clothing ID is associated with a plurality of clothing images with different clothing sizes, second body type parameters, and posture information are different in the first information, the receiver 24 reads, for each of the clothing IDs, a clothing image associated with representative one of the clothing sizes, representative one of the second body type parameter sets, and representative one of the pieces of posture information, from the first information, as a clothing image representative of the clothing ID. The display controller 42 then controls to display a list of the clothing images on the display 20.

The representative clothing size, second body type parameter set, and posture information retrieved by the receiver 24 may be set in advance. The receiver 24 may use a clothing size entered by a user and received via the input unit 16 as the representative clothing size.

Once a list of clothing images is displayed on the display 20, the user then selects, by making an operation instruction on the input unit 16, a clothing image of the piece of clothing to be tried on from the list of clothing images displayed on the display 20. The input unit 16 then outputs the clothing ID of the clothing image selected by the user to the image processing apparatus 12. A clothing size is also entered by a user making an operation instruction on the input unit 16.

The receiver 24 receives the selected clothing ID and the entered clothing size from the input unit 16. In this manner, the receiver 24 receives the clothing ID and the clothing size of the clothing to be tried on.

The receiver 24 may receive at least the clothing ID of the piece of clothing to be tried on, without receiving the size of the piece of clothing to be tried on. In other words, a user may enter only the clothing ID on the input unit 16, without entering the clothing size.

The second acquirer 31 acquires a first body type parameter representing the body type of the first subject. A first body type parameter includes one or more parameters, in the same manner as the second body type parameter. The parameters are the same as those included in the second body type parameter.

The second acquirer 31 acquires a first body type parameter entered by a user making an operation instruction on the input unit 16 via the receiver 24.

The display controller 42 displays, for example, an input screen for entering a first body type parameter representing the body type of the first subject on the display 20. The input screen includes, for example, fields for entering parameters such as a chest circumference, a waist circumference, a hip circumference, a height, a shoulder width, and a weight. The user then enters these values to the respective parameter fields by operating the input unit 16 while looking at the input screen displayed on the display 20. The receiver 24 outputs the first body type parameters received from the input unit 16 to the second acquirer 31. The second acquirer 31 then acquires the first body type parameters from the receiver 24.

The second acquirer 31 may estimate the first body type parameters of the first subject. In the example explained in the first embodiment, the second acquirer 31 estimates the first body type parameters of the first subject.

The second acquirer 31 includes a third acquirer 23, a fourth acquirer 26, and an estimator 27.

The third acquirer 23 acquires a depth map of the first subject. The third acquirer 23 acquires a depth map of the first subject by extracting a person area from the depth map received from the second imager 14B.

The third acquirer 23 extracts a person area, for example, by setting a threshold to a depth-direction distance of a three-dimensional position represented by each of the pixels making up the depth map. Let us assume herein that, in the coordinate system of the second imager 14B, for example, the point of origin is at the position of the second imager 14B, and the positive direction in the Z axis corresponds to the optical axis of the camera extending from the point of origin at the second imager 14B toward the subject. With such an assumption, a pixel of which depth-direction (Z-axis direction) coordinate is equal to or more than a predetermined threshold (for example, a value indicating two meters) is excluded from the pixels making up the depth map. In this manner, the third acquirer 23 acquires a depth map of the first subject that is a depth map consisting of pixels of a person area that is represented within a range of two meters from the second imager 14B.

The estimator 27 estimates the first body type parameters of the first subject from the depth map of the first subject acquired by the third acquirer 23.

The estimator 27 applies a piece of three-dimensional model data of a human body to the depth map of the first subject. The estimator 27 then calculates a value of each of the first body type parameters (e.g., a height, a chest circumference, a waist circumference, a hip circumference, and a shoulder width values) using the depth map and the three-dimensional model data applied to the first subject. In this manner, the estimator 27 estimates the first body type parameter of a first subject.

Figure 7A:
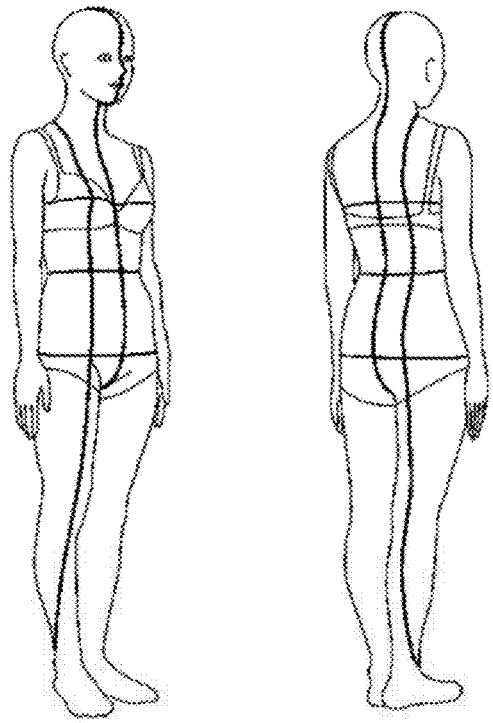
FIGS. 7A and 7B are schematics for explaining estimation of first body type parameters.
Figure 7B:
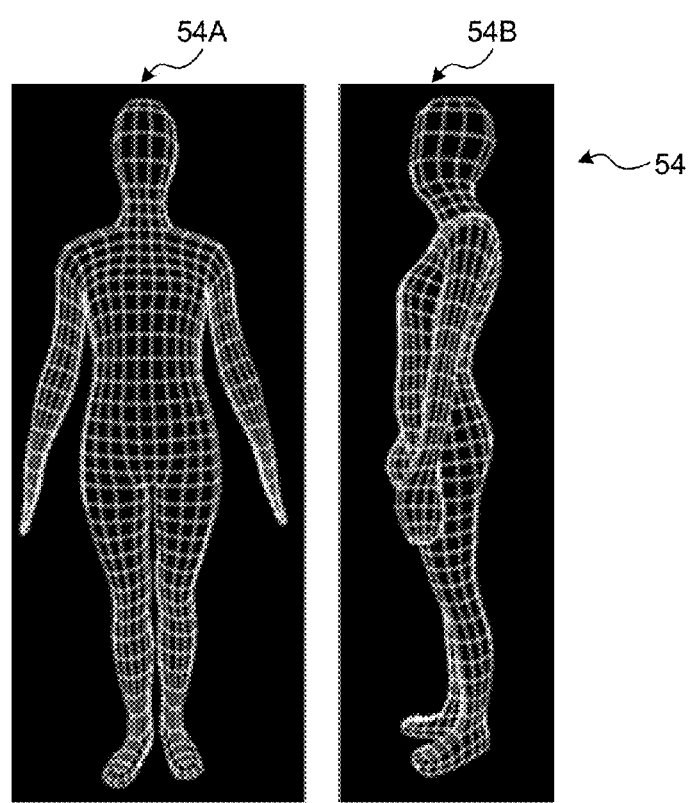

FIGS. 7A and 7B are schematics for explaining the estimation of the first body type parameters. FIG. 7A is a schematic of exemplary three-dimensional model data of a human body. FIG. 7B is a schematic of model images 54 with the three-dimensional model data of a human body applied to the depth map of the first subject. The model image 54A is an image representing a three-dimensional model of the rear side of a first subject. The model image 54B is an image representing a three-dimensional model of a side of the first subject.

Specifically, the estimator 27 applies a piece of three-dimensional model data (three-dimensional polygon model) of a human body to the depth map of the first subject. The estimator 27 then estimates the measurements based on the distances of regions corresponding to the respective parameters (e.g., the height, the chest circumference, the waist circumference, the hip circumference, and the shoulder width) in the three-dimensional model data of a human body applied to the depth map of the first subject. Specifically, the estimator 27 calculates the value of each of the parameters such as the height, the chest circumference, the waist circumference, the hip circumference, and the shoulder width, based on the distance between two apexes or the length of an edge line connecting two apexes in the applied three-dimensional model data of a human body. The two apexes herein mean an end and the other end of a region corresponding to a parameter to be calculated (e.g., the height, the chest circumference, the waist circumference, the hip circumference, and the shoulder width) in the applied three-dimensional model data of a human body. A value of each of the second body type parameters of a second subject may be calculated in the same manner.

The estimator 27 preferably corrects each of the first body type parameter estimated from the depth map, in a manner so that the first body type parameter becomes smaller when the piece of clothing identified by the clothing ID received by the receiver 24 hides a body more.

The estimator 27 reads the correction value corresponding to the clothing ID received by the receiver 24 from the fourth information stored in the storage 18. The estimator 27 then corrects the value of each of the first body type parameters estimated from the depth map to the product of the parameter multiplied by the correction value read from the fourth information.

For example, when the first subject who is captured by the imager 14 is heavily dressed, the value of the first body type parameter estimated from the depth map by the estimator 27 may indicate a body type that is different from the actual body type of the first subject. It is preferable, for this reason, to correct the estimated first body type parameter.

In the first embodiment, the correction is made assuming that the first subject is now actually wearing the piece of clothing corresponding to the clothing ID of a piece of clothing to be tried on entered by a user. A correction value of "one" is used when the body is hidden less, and a correction value closer to zero is used when the body is hidden more, as mentioned earlier. By applying the correction described above, the estimator 27 can estimate the first parameters representing the body type of the first subject more accurately.

An instruction button for instructing a correction may be displayed on the display 20, and the estimator 27 may perform the correction when a user making an operation instruction on the input unit 16 gives such an instruction via the instruction button.

Referring back to FIG. 1, the fourth acquirer 26 acquires the weight of the first subject. The fourth acquirer 26 may acquire the weight entered by a user via the receiver 24, or acquire the weight of the first subject from the weight measurer 19.

The second acquirer 31 may not include the fourth acquirer 26. In such a configuration, the second acquirer 31 acquires the first body type parameter including parameters other than the weight. When the second acquirer 31 includes the fourth acquirer 26, the second acquirer 31 acquires the weight acquired by the fourth acquirer 26, and the parameters estimated by the estimator 27, as the first body type parameters.

The extractor 32 generates skeletal information on the first subject.

To explain specifically, to begin with, the extractor 32 generates first skeletal information indicating the position of the skeleton of a human body, for each of the pixels making up the depth map of the first subject, the depth map acquired by the third acquirer 23. The extractor 32 generates the first skeletal information by applying a shape of a human body to the depth map.

The extractor 32 then converts the coordinate system of the pixels of the generated first skeletal information (that is, the coordinate system of the second imager 14B) into a coordinate system of the pixels of the subject image acquired by the first acquirer 22 (that is, the coordinate system of the first imager 14A). In other words, the extractor 32 converts the coordinate system of the pixels of the first skeletal information calculated from the depth map of the subject, the depth map being captured by the second imager 14B, into a coordinate system of the subject image that is captured by the first imager 14A at the same timing as the depth map. This coordinate conversion is achieved by performing a known calibration. In this manner, the extractor 32 generates the first skeletal information applied with the coordinate conversion as the skeletal information.

The first calculator 33 calculates the posture information on the first subject. The first calculator 33 calculates the posture information on the first subject from the skeletal information on the first subject generated by the extractor 32.

The first calculator 33 calculates the orientation of the first subject from, for example, the positions of the joints represented in the skeletal information on the first subject.

Figure 8:
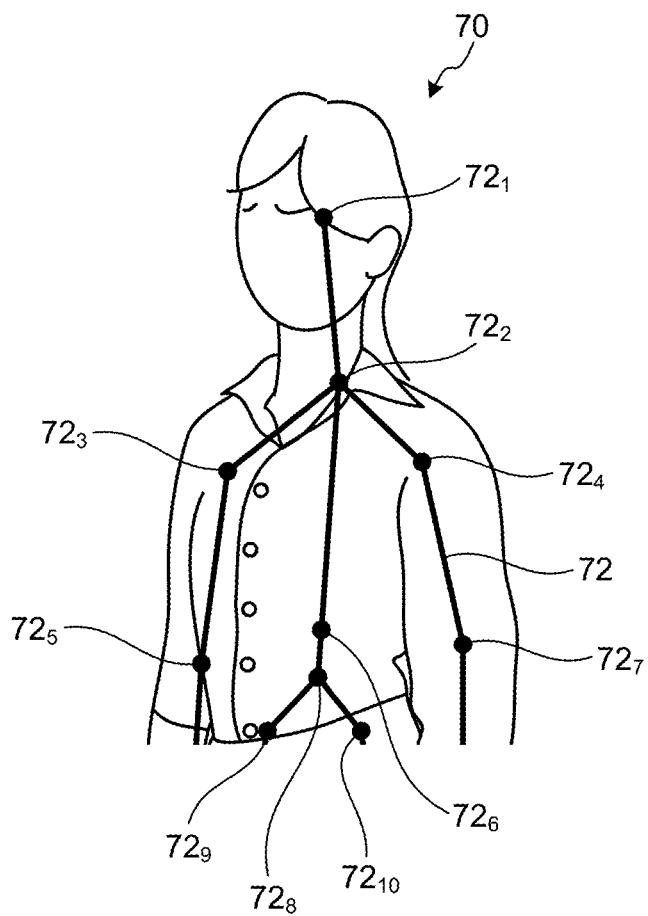
FIG. 8 is a schematic for explaining calculation of posture information on a first subject.

FIG. 8 is a schematic for explaining the calculation of the posture information on the first subject.

Psl denotes the coordinates of the pixel corresponding to the left shoulder of the first subject represented in the skeletal information on the first subject calculated by the extractor 32 in the coordinate system of the first imager 14A (see the pixel position $72_4$ in FIG. 8). Psr denotes the coordinates of the pixel corresponding to the right shoulder of the first subject represented in the skeletal information on the first subject calculated by the extractor 32 in the coordinate system of the first imager 14A (see the pixel position $72_3$ in FIG. 8).

From these pieces of coordinate information, the extractor 32 calculates the orientation of the first subject with respect to the first imager 14A, from Equation (1).

$$\text{Orientation of First Subject} = \arctan(Psl.z - Psr.z/Psl.x - Psr.x) \quad (1)$$

In Equation (1), Psl.z denotes the z coordinate of the pixel corresponding to the left shoulder of the first subject. Psr.z denotes the z coordinate of the pixel corresponding to the right shoulder of the first subject. In Equation (1), Psl.x denotes the x coordinate of the pixel corresponding to the left shoulder of the first subject. Psr.x denotes the x coordinate of the pixel corresponding to the right shoulder of the first subject.

In this manner, the first calculator 33 calculates the orientation of the first subject as the posture information.

Referring back to FIG. 1, the identifier 28 identifies a clothing image to be output, from a plurality of clothing images associated with the received clothing ID in the first information. A clothing image to be output means an image to be output to the display 20 or other external device. When the clothing image is to be output to the display 20, to output means to be displayed.

Specifically, the identifier 28 identifies a clothing image that is associated with a second body type parameter and of which dissimilarity with the first body type parameter acquired by the second acquirer 31 is equal to or less than the threshold, from the clothing images associated with the received clothing ID in the first information. The dissimilarity indicates a degree by which the first body type parameter is dissimilar to the second body type parameter. A lower dissimilarity indicates that the first body type parameter is more similar to the second body type parameter, and a higher dissimilarity indicates that the first body type parameter is more dissimilar to the second body type parameter.

The identifier 28, to begin with, calculates the dissimilarity of each of the second body type parameters associated with the clothing ID received by the receiver 24 in the first information stored in the storage 18, with the first body type parameter acquired by the second acquirer 31.

In the first embodiment, the identifier 28 uses the difference between the first body type parameter and the second body type parameter as the dissimilarity.

The identifier 28 then calculates the difference between the first body type parameter and the second body type parameter using, for example, a L1 norm or a L2 norm.

When the L1 norm is used, the identifier 28 calculates the difference (hereinafter, referred to as a first difference) between the value of a first body type parameter acquired by the second acquirer 31 and the value of the corresponding second body type parameter associated with the clothing ID received by the receiver 24. The identifier 28 then calculates the sum of the absolute values of the first differences between the respective first body type parameters and second body type parameters as a difference (dissimilarity) between the first body type parameters and the second body type parameters.

Specifically, when the L1 norm is used, the identifier 28 calculates the dissimilarity using Equation (2) below. Equation (2) assumes that the first body type parameters and the second body type parameters include a height, a chest circumference, a waist circumference, a hip circumference, a shoulder width, and a weight.

$$\text{Dissimilarity} = |A1-A2| + |B1-B2| + |C1-C2| + |D1-D2| + |E1-E2| + |F1-F2| \quad (2)$$

In Equation (2), A1 denotes the height of the first subject represented by the first body type parameter, and A2 denotes the height represented by the second body type parameter. B1 denotes the chest circumference of the first subject represented by the first body type parameter, and B2 denotes the chest circumference represented by the second body type parameter. C1 denotes the waist circumference of the first subject represented by the first body type parameter, and C2 denotes the waist circumference represented by the second body type parameter. D1 denotes the hip circumference of the first subject represented by the first body type parameter, and D2 denotes the hip circumference represented by the second body type parameter. E1 denotes the shoulder width of the first subject represented by the first body type parameter, and E2 denotes the shoulder width represented by the second body type parameter. F1 denotes the weight of the first subject represented by the first body type parameter, and F2 denotes the weight represented by the second body type parameter.

When the L2 norm is used, the identifier 28 calculates the sum of the squares of the respective values of the first differences between the respective first body type parameters and second body type parameters, as a difference (dissimilarity) between the first body type parameters and the second body type parameters.

Specifically, when the L2 norm is used, the identifier 28 calculates the dissimilarity using Equation (3) below. Equation (2) assumes that the first body type parameters and the second body type parameters include a height, a chest circumference, a waist circumference, a hip circumference, a shoulder width, and a weight as parameters. In Equation (3), A1, A2, B1, B2, C1, C2, D1, D2, E1, E2, F1, and F2 denote the same as those in Equation (3).

$$\text{Dissimilarity} = |A1-A2|^2 + |B1-B2|^2 + |C1-C2|^2 + |D1-D2|^2 + |E1-E2|^2 + |F1-F2|^2 \quad (3)$$

After the dissimilarity (difference in the first embodiment) is calculated, the identifier 28 may perform the following process.

Specifically, the identifier 28 may apply a conversion function to the difference so that the weighting value of each of the second body type parameters is increased when the result of subtracting the value of the corresponding first body type parameter from the value of the second body type parameter is more than zero, compared with that when the result of the subtraction is less than zero.

With this process, the image processing apparatus 12 can prevent the clothing image from being displayed in a larger size than the first subject when a synthetic image of the subject image of the first subject and the clothing image is displayed.

Before calculating the difference, the identifier 28 may convert the values of the first body type parameters and of the second body type parameters using the corresponding weighting values specified in the second information. In such a case, the identifier 28 reads the weighting values for the respective parameters corresponding to the clothing ID received by the receiver 24 from the second information (see FIG. 5). Before calculating the difference, the identifier 28 multiples the weighting value read for each of the parameters to the corresponding first body type parameter and to the corresponding second body type parameter. The identifier 28 may then use the product of this multiplication corresponding to each of the parameters in calculating the dissimilarity as the parameter values.

As mentioned earlier, the weighting value indicates the degree by which the appearance of a subject wearing a piece of clothing identified by a clothing ID in the second information is affected. Therefore, by allowing the identifier 28 to calculate the dissimilarity considering the weighting values, the identifier 28 can identify a clothing image that matches more closely to the body type of the first subject.

The identifier 28 may calculate, for each of the parameters, the weighting value. The identifier 28 may then use the calculated weighting value instead of the weighting value specified in the second information.

In such a case, the identifier 28 calculates a weighting value corresponding to each of the parameters based on the posture information on the first subject calculated by the first calculator 33.

Specifically, let us assume that the identifier 28 determines that the posture information on the first subject calculated by the first calculator 33 indicates that the first subject is facing the front direction (the front side with respect to the first imager 14A). In such a case, the identifier 28 sets relatively higher weighting values to the shoulder width and to the height with respect to those set to the other parameters. Because the weight of the first subject is received from the weight measurer 19 or the input unit 16, the identifier 28 sets a relatively higher weighting value to the weight, as well as the shoulder width and the height, than those set to the other parameters.

This is because when a depth map is created from an image of the first subject captured directly from the front side, the shoulder width and the height of the first subject can be estimated more accurately, in comparison with the other parameters, than when the image is captured from the directions other than the front side. By allowing the identifier 28 to calculate a weighting value for each of these parameters, the dissimilarity (the difference in the first embodiment) can be calculated more accurately.

The identifier 28 may also calculate the dissimilarity using some of the first body type parameters and the second body type parameters.

Specifically, the identifier 28 reads the parameters to be used for dissimilarity calculation, among those in the first and the second body type parameters (see FIG. 6), corresponding to the clothing type of the clothing ID received by the receiver 24 from the third information. The identifier 28 can read the clothing type corresponding to the clothing ID from the first information. When the third information sets, for each of clothing IDs, the parameters to be used in the dissimilarity calculation, the identifier 28 may read the parameters corresponding to the clothing ID received by the receiver 24 from the third information, as the parameters to be used in the dissimilarity calculation.

The identifier 28 may then perform the dissimilarity calculation using the parameters to be used in the dissimilarity calculation read from the third information, among the first body type parameters and second body type parameters.

When the types of the first body type parameters are different from those of the second body type parameters, the identifier 28 may perform the dissimilarity calculation using the parameters that are common between the first and the second body type parameters.

Through the process described above, the identifier 28 calculates the dissimilarity of each of the second body type parameters associated with the received clothing ID in the first information with the first body type parameter.

The identifier 28 then identifies a second body type parameter of which dissimilarity is calculated to be equal to or lower than a threshold. In other words, the identifier 28 identifies a second body type parameter that is similar to the corresponding first body type parameter, among the second body type parameters associated with the received clothing ID in the first information.

As mentioned earlier, the dissimilarity indicates the degree by which a first body type parameter and the corresponding second body type parameter are dissimilar to each other. Lower dissimilarity between the first body type parameter and the second body type parameter means higher similarity between the first body type parameter and the second body type parameter.

The identifier 28 therefore identifies a second body type parameter of which dissimilarity is calculated to be equal to or lower than the threshold. The threshold of the dissimilarity may be established in advance. The threshold of the dissimilarity may be modified as appropriate, by a user making an operation instruction on the input unit 16, for example.

The identifier 28 then identifies a clothing image associated with the second body type parameter of which dissimilarity is equal to or less than the threshold.

Figure 9:
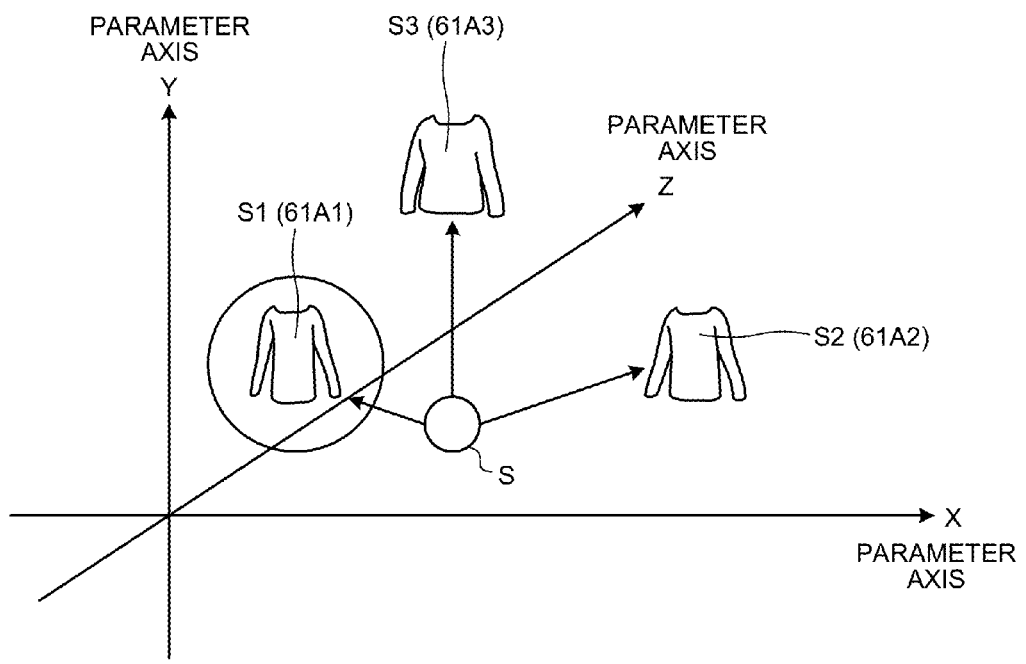
FIG. 9 is a schematic for explaining clothing image identification.

FIG. 9 is a schematic for explaining the identification of the clothing image performed by the identifier 28. In FIG. 9, as an example, three types of parameters in the first body type parameters and the second body type parameters are represented as the X axis, the Y axis, and the Z axis, respectively. It is assumed herein as an example that a first body type parameter S is acquired by the second acquirer 31, and second body type parameters S1 to S3 are associated with the clothing ID received by the receiver 24. It is also assumed herein that the second body type parameter of which dissimilarity with the first body type parameter S is equal to or lower than the threshold is the second body type parameter S1, which is at the shortest distance from the first body type parameter S, among the second body type parameters S1 to S3. The identifier 28 then selects the second body type parameter S1.

The identifier 28 then determines a clothing image A1 corresponding to the selected second body type parameter S1 as a clothing image to be output, from among the clothing images 61A1 to 61A3 associated with the second body type parameters S1 to S3, respectively.

When the identifier 28 finds a plurality of clothing images associated with the second body type parameter of which dissimilarity is equal to or lower than the threshold, the identifier 28 outputs the clothing image of which dissimilarity is lowest as the clothing image to be output.

The identifier 28 may identify a clothing image taking the clothing size received from the input unit 16 by the receiver 24 into consideration. In such a case, the identifier 28 identifies a clothing image associated with a second body type parameter of which dissimilarity is equal to or less than the threshold, among those associated with the clothing ID and the clothing size received by the receiver 24 in the first information.

When the identifier 28 finds a plurality of clothing images associated with the second body type parameter of which dissimilarity is equal to or lower than the threshold, the identifier 28 may select one of the clothing images through the process of template matching described later. In the first embodiment, before synthesizing the clothing image to the subject image, template matching of which details will be described later is performed using feature regions of the clothing image (e.g., shoulder regions) and of the depth map of the first subject. At this time, one of the clothing images identified by the identifier 28 of which shoulder region represents the highest degree of matching with the shoulder region in the depth map of the first subject may be identified as a clothing image to be output.

The identifier 28 may identify the clothing image taking posture information on the first subject into consideration.

When such a consideration is made, the identifier 28 may identify a clothing image associated with the second body type parameter of which dissimilarity is equal to or less than the threshold and corresponding to the posture information calculated by the first calculator 33, among those associated with the clothing ID received by the receiver 24 in the first image.

Figure 10:
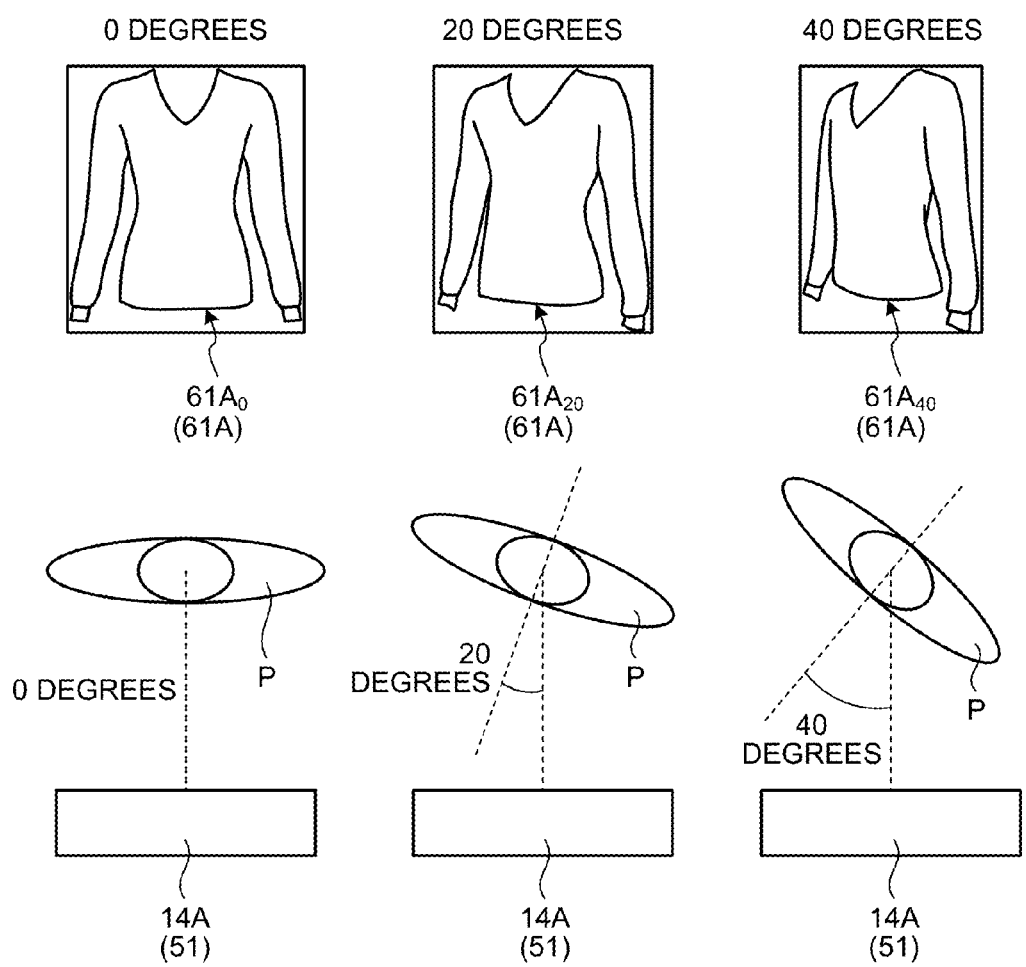
FIG. 10 is a schematic for explaining posture information.

FIG. 10 is a schematic for explaining the posture information.

Let us assumed herein that, as an example, a plurality of clothing images 61A ($61A_0$, $61A_{20}$, $61A_{40}$) are registered in advance in the first information as the clothing images corresponding to a second body type parameter. The clothing images $61A_0$, $61A_{20}$, and $61A_{40}$ correspond to respective pieces of posture information including a "front side" that is the front side with respect to the first imager 14A provided to the housing 51, "+20 degrees" that is the orientation rotated by 20 degree to the right from the front side, and "+40 degrees" that is the orientation rotated by 40 degree to the right from the front side.

Assuming that the posture information calculated by the first calculator 33 is the "front side", the identifier 28 selects the clothing image (for example, clothing image $61A_0$) corresponding to the posture information calculated by the first calculator 33, as well as to the clothing ID received by the receiver 24 in the first information, from the clothing images 61A ($61A_0$, $61A_{20}$, $61A_{40}$), because the clothing image $61A_0$ is associated with the "front side" as the orientation of the first subject and is associated with the second body type parameter of which dissimilarity is equal to or lower than the threshold in the first information.

The identifier 28 may identify a clothing image to be output by incrementally narrowing down the clothing images.

In such a configuration, the identifier 28 calculates the dissimilarity of one of the first body type parameters with the corresponding second body type parameters, and identifies a plurality of second body type parameters of which dissimilarity is equal to or lower than the threshold. The identifier 28 again calculates the dissimilarity of another pair of parameters not used in the previous identification, and identifies a second body type parameter of which dissimilarity is equal to or lower than the threshold, among those previously identified. The identifier 28 repeats this process while changing the parameters until the second body type parameters are narrowed down to a predetermined number. In this manner, the identifier 28 can incrementally identify a clothing image to be output.

When a clothing image to be output is incrementally identified, the identifier 28 may use one or more parameters in each of the steps.

When a clothing image to be output is incrementally identified, the identifier 28 may incrementally identify a clothing image to be output sequentially using the parameters with a higher weighting value (see FIG. 5).

The type of parameters to be used at each of the steps may be stored in the storage 18 in advance. In other words, the storage 18 may store therein information indicating the steps in a manner associated with the types of parameters. In such a case, the identifier 28 reads the parameters of the type used at the corresponding step from the storage 18, and incrementally identifies a clothing image to be output using a corresponding parameter.

When the identifier 28 identifies a plurality of clothing images at each of the steps or finally, the identifier 28 may select one of the clothing images specified by a user as a clothing image to be output.

It is assumed now that, as an example, the identifier 28 identifies a plurality of clothing images at each of the steps or finally. The display controller 42 then displays a list of the identified clothing images on the display 20. A user then selects one of the clothing images as the clothing image to be output by making an operation on the input unit 16, while looking at the list of clothing images displayed on the display 20. The receiver 24 then receives the instruction of the selection of the clothing image to be output from the input unit 16. The identifier 28 can then select the clothing image specified with the selecting instruction received by the receiver 24 as the clothing image to be output, among those displayed on the display 20.

The one or more clothing images identified by the identifier 28 may be displayed on the display 20 before synthesizing to the subject image described later. In such a configuration, when the identifier 28 identifies one or more clothing images incrementally or finally, the display controller 42 displays the identified one or more clothing images on the display 20.

Displaying the clothing images on the display 20 before synthesizing the clothing image to the subject image has following advantages.

The image processing apparatus 12 can display a piece of clothing to be tried on designated by the first subject on the display 20, the piece of clothing worn by a second subject having a body type that matches or that is similar to that of the first subject, before the clothing image is synthesized to the subject image.

When the receiver 24 receives a clothing ID of a piece of clothing to be tried on and a clothing size as well from the input unit 16, the image processing apparatus 12 can display the piece of clothing to be tried on designated by the first subject on the display 20, the piece of clothing worn by a second subject having a body type that matches or that is similar to the first subject, before the clothing image is synthesized to the subject image.

The image processing apparatus 12 can therefore present an image of the clothing being tried on based on the body type of the first subject.

The generator 40 generates a synthetic image of a subject image and the clothing image identified by the identifier 28.

Figure 11:
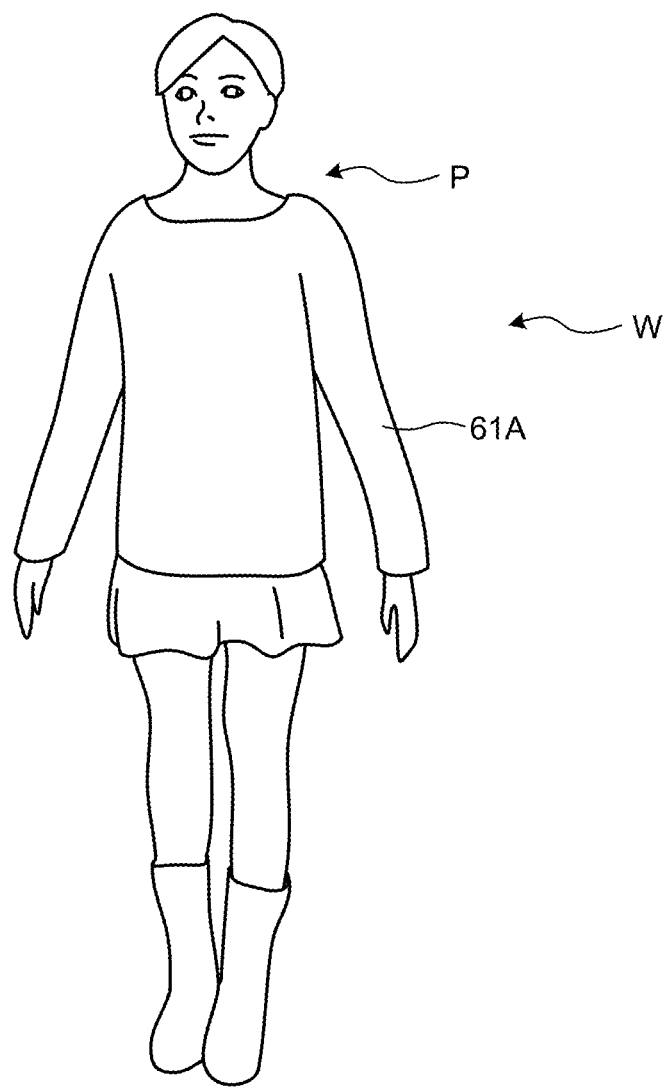
FIG. 11 is a schematic for explaining a synthetic image.

FIG. 11 is a schematic for explaining a synthetic image W. The generator 40 generates a synthetic image W in which the clothing image 61A identified by the identifier 28 is superimposed on the first subject P. The identified clothing image 61A is a clothing image presenting a second subject whose body type matches or is similar to the first subject wearing the piece of clothing associated with the clothing ID received by the receiver 24. The generator 40 can therefore generate a synthetic image W presenting an image of the clothing being tried on based on the body type of the first subject.

In the first embodiment, the generator 40 executes a more detailed process (details are explained later).

Referring back to FIG. 1, the update controller 43 registers and updates the first information.

Figure 12:
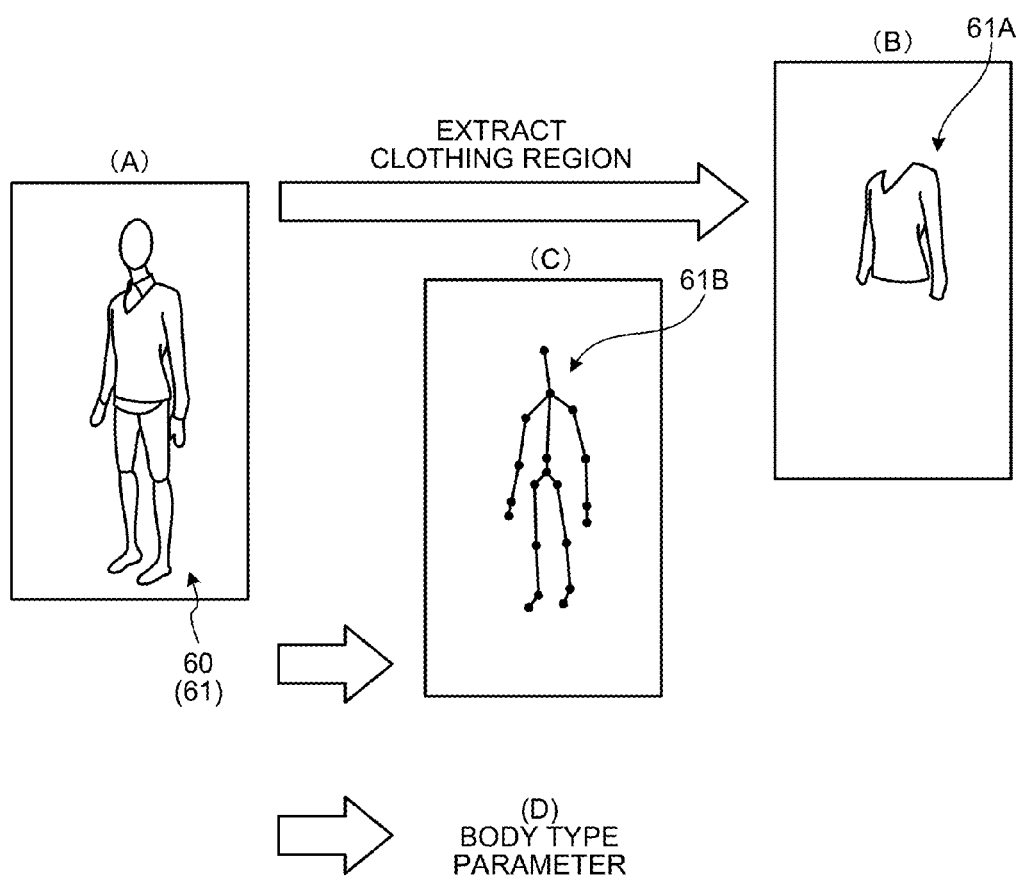
FIG. 12 is a schematic for explaining registration and updating of the first information.

FIG. 12 is a schematic for explaining registration and updating of the first information.

To begin with, the clothing in the respective clothing sizes are prepared for each piece of clothing identified by a clothing ID. The clothing in each of the clothing sizes is then put on a plurality of second subjects with different body types. A second subject 60 such as a mannequin wearing a clothing 61 is prepared, as an example, as illustrated in part (A) in FIG. 12. Similarly, each of the remaining clothing 61 in different clothing sizes are then put on the second subjects 60 with different body types.

Subject images of the respective second subjects and corresponding depth maps are acquired by capturing the images of the second subjects 60 with different body types wearing the clothing 61 in each of the clothing sizes, using a device that is similar to the imager 14. The update controller 43 then extracts a clothing image by cutting out a clothing area from each of the subject images. Specifically, the update controller 43 sets a mask representing a clothing region. The update controller 43 acquires a plurality of clothing images 61A (see part (B) in FIG. 12) representing the second subjects with different body types wearing the clothing in each of the clothing sizes.

The update controller 43 then acquires a second body type parameter representing the body type of the second subject 60 from the corresponding depth map, in the same manner as the second acquirer 31 (see part (D) in FIG. 12). The update controller 43 also estimates the second body type parameter of each of the second subjects, using the depth map of the second subject wearing a piece of clothing that reveals the body line of the second subject (e.g., a piece of underwear), in the same manner as the estimator 27. The update controller 43 may correct the second body type parameter estimated from the depth map, with the correction value associated with the clothing ID stored in the fourth information, in the same manner as the estimator 27. The update controller 43 may also acquire the second body type parameter representing the body type of the corresponding second subject 60, through a user operation of the input unit 16.

The update controller 43 calculates skeletal information 61B of the second subject 60, in the same manner as the extractor 32, and calculates the posture information on the second subject 60, in the same manner as the first calculator 33 (see part (C) in FIG. 12).

Every time images of one of the second subjects 60 with different body types wearing a piece of clothing 61 in each of the sizes are captured, the update controller 43 performs the calculation and the extraction explained above, and associates the clothing size, the calculated second body type parameters, the calculated model ID of the second subject, the calculated posture information, and the extracted clothing image with the clothing ID. Through this process, the update controller 43 registers or updates the first information. When a user enters a clothing type or a piece of attribute information by making an operation instruction on the input unit 16, the update controller 43 receives the inputs, and associates the information with the corresponding clothing ID.

Referring back to FIG. 1, the adjuster 30 enlarges or reduces the size of at least one of the clothing image and the subject image so that at least a part of the contour line of the clothing image to be output identified by the identifier 28 matches at least a part of the contour line of the first subject in the subject image. The adjuster 30 also extracts a feature region to be used by the second calculator 34, which is described later, from each of the enlarged or reduced clothing image and subject image.

The adjuster 30 then converts the coordinate system of the depth map of the first subject acquired by the third acquirer 23 (that is, the coordinate system of the second imager 14B) into the coordinate system of the subject image of the first subject acquired by the first acquirer 22 (that is, the coordinate system of the first imager 14A). The adjuster 30 then adjusts the resolution of the depth map of the first subject applied with the coordinate conversion to the resolution of the subject image of the first subject captured at the same timing, by projecting the pixel at each pixel position in the depth map onto the corresponding pixel in the subject image.

When the resolution of the depth map acquired by the second imager 14B is 640×480 pixels and the resolution of the subject image captured by the first imager 14A is 1080×1920 pixels, for example, projection of each of the pixel making up the depth map onto the subject image as a point with a size of one pixel by one pixel would result in a space between the pixels making up the depth map. The adjuster 30 therefore applies a Gaussian filter or a filter using known operations such as morphological operations as required, to adjust the resolution so that no space is formed between the pixels making up the depth map projected onto the subject image.

The adjuster 30 then calculates the size of the feature region in the clothing image to be output identified by the identifier 28.

The feature region is a region enabling estimation of the shape of the first subject who is to try on a piece of clothing. Examples of the feature region includes a shoulder region corresponding to the shoulders, a hip region corresponding to the hip, or feet region corresponding to the lengths of the feet of a human body, but the feature region is not limited thereto. Used in the description of the first embodiment is an example in which the feature region is shoulder regions corresponding to the shoulders of a human body, but the feature region is not limited to a shoulder region.

The adjuster 30 calculates, for example, the shoulder width in the clothing image to be output identified by the identifier 28 as the size of the feature region of the clothing image.

Figure 13A:
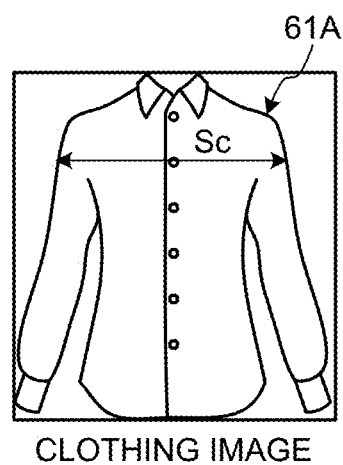
FIGS. 13A and 13B are schematics for explaining calculation of the size of a feature region.
Figure 13B:
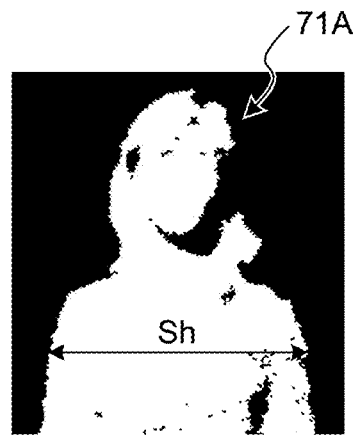

FIGS. 13A and 13B are schematics for explaining calculation of the size of a feature region in the clothing image, performed by the adjuster 30.

Among the joints in the clothing image, the adjuster 30 acquires the Y coordinate of the pixel corresponding to the left shoulder and the Y coordinate of the pixel corresponding to the right shoulder from the skeletal information included in and corresponding to the clothing image to be output identified by the identifier 28. The adjuster 30 then acquires an average Y coordinate from these Y coordinates. The adjuster 30 then looks for an X coordinate indicating the position of the border of the clothing on the side of the left shoulder by performing retrieval along the position (height) of the acquired Y coordinate from the X coordinate of the pixel corresponding to the left shoulder toward the area outside of the clothing. The adjuster 30 also looks for an X coordinate of the position of the border of the clothing on the side of the left shoulder by performing retrieval along the position (height) of the acquired Y coordinate from the X coordinate of the pixel corresponding to the right shoulder toward the area outside of the clothing.

The adjuster 30 can then calculate the shoulder width (the number of pixels) of the clothing image by calculating the difference between these two X coordinates (see the shoulder width Sc in the clothing image 61A in FIG. 13A).

Instead of calculating the shoulder width at one Y coordinate corresponding to the shoulder joints, the adjuster 30 may calculate the shoulder width in the manner described below. The adjuster 30 may ensure a range of Y coordinates above and below the Y coordinate of the shoulder joints at the center, perform the retrieval along a plurality of horizontal lines, and calculate the average of the X coordinates on each side in the horizontal direction, to allow the shoulder width to be calculated from the X coordinates.

The adjuster 30 then calculates the shoulder width in the subject image, using the depth map of the first subject of which resolution is adjusted to that of the subject image and the skeletal information on the first subject.

The adjuster 30 calculates the average Y coordinate between the Y coordinate of the pixel corresponding to the left shoulder and the Y coordinate of the pixel corresponding to the right shoulder in the depth map of the first subject, as illustrated in FIG. 13B. The adjuster 30 then looks for an X coordinate indicating the position of one border of the subject region by performing retrieval from the X coordinate of the pixel corresponding to the left shoulder toward the area outside of the subject.

The adjuster 30 then looks for another X coordinate indicating the position of other border of the subject region by performing retrieval from the X coordinate of the pixel corresponding to the right shoulder toward the area outside of the subject in the depth map of the first subject.

The adjuster 30 then calculates the shoulder width (the number of pixels) of the first subject in the subject image by calculating the difference between these calculated X coordinates (see the shoulder width Sh in the depth map 71A of the first subject in FIG. 13B).

Instead of calculating the shoulder width at one Y coordinate corresponding to the shoulder joints, the adjuster 30 may calculate the shoulder width in the manner described below. The adjuster 30 may ensure a range of Y coordinates above and below the Y coordinate of the shoulder joints at the center, perform the retrieval along a plurality of horizontal lines, and calculate the average of the X coordinates on each side in the horizontal direction, to calculate the shoulder width from the X coordinates.

The adjuster 30 then determines a scaling ratio (an enlargement and reduction ratio) of the clothing image, using the sizes of the calculated feature region, that is, the shoulder width Sc of the clothing image and the shoulder width Sh of the subject image.

Specifically, the adjuster 30 calculates a quotient resulting from dividing the shoulder width Sh of the subject image by the shoulder width Sc of the clothing image (Sh/Sc) as a scaling ratio. The scaling ratio may be calculated from a different operation, using numbers such as the actual size of the clothing, and the number of pixels corresponding to the width or the height of the clothing image region.

The adjuster 30 then enlarges or reduces the size of the clothing image to be output by the enlargement and reduction ratio determined by the scaling ratio. Similarly, the adjuster 30 also enlarges or reduces the size of the skeletal information included in the posture information on the clothing image to be output, by the enlargement and reduction ratio determined by the same scaling ratio (Sh/Sc).

The adjuster 30 then extracts a feature region to be used by the second calculator 34 described later, from each of the clothing image identified by the identifier 28 and the subject image, both images of which are enlarged or reduced in size.

The feature region is a region for enabling the shape of the first subject in each of the identified clothing image and the subject image to be estimated. Examples of the feature region include regions representing the shoulders, the hip, or the like of a human body. Explained in the first embodiment hereunder is an example in which the adjuster 30 extracts a region corresponding to the shoulders of a human body (shoulder region) from each of the contour lines of the clothing image and of the subject image as a feature region.

To begin with, the adjuster 30 extracts a contour line from the depth map of the first subject applied with the coordinate conversion and of which resolution is adjusted. The adjuster 30 extracts a contour line from the clothing image of which size is enlarged or reduced to the same scale of the subject image. A known method is used to extract the contour lines. The adjuster 30 then extracts the contour line of the region corresponding to the shoulders of a human body (shoulder regions) from each of these contour lines, as feature regions.

The adjuster 30 preferably extracts a contour line based on the shape of the clothing image.

Figure 14:
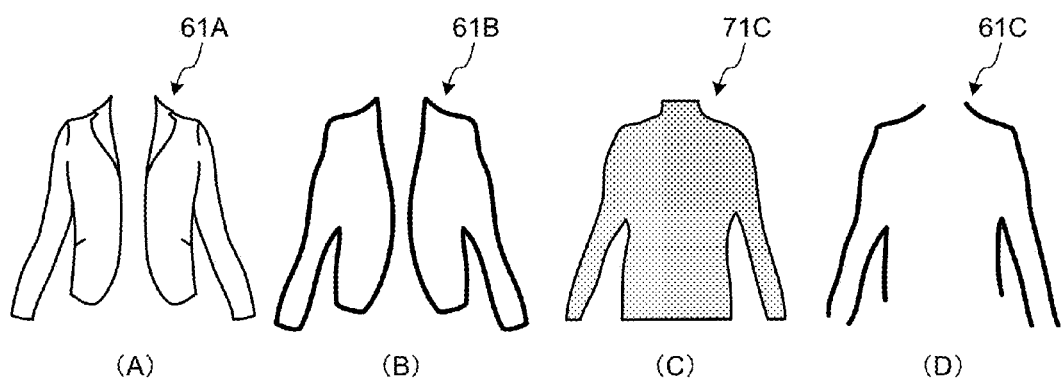
FIG. 14 is a schematic illustrating exemplary contour line extraction.

FIG. 14 is a schematic illustrating exemplary contour line extraction.

Assuming that the clothing image 61A to be output having identified and of which size is enlarged or reduced has a vertically elongated opening on the front side of the human body, as illustrated in part (A) in FIG. 14. Such a clothing image includes contour lines extending across the center of the human body, as illustrated in part (B) in FIG. 14. If the second calculator 34, which is described later, uses such contour lines in template matching (described in details later), the matching accuracy of the regions corresponding to the center of the human body may decline.

To address this issue, when the clothing image to be output 61A has a vertically elongated opening on the front side of the human body, the adjuster 30 removes the contour lines extending across the region corresponding to the center of the human body, from the contour lines illustrated in part (B) in FIG. 14, so that only the contour line 61C following the external shape of the human body is extracted as a contour line of the clothing image (part (D) in FIG. 14).

In the image processing apparatus 12, when the update controller 43 registers a clothing image to the first information, the update controller 43 also stores in advance the depth map of the second subject who has tried on the clothing of the clothing image in the first information that is stored in the storage 18. The depth map of the second subject is stored in a manner associated with the clothing image. The adjuster 30 removes a part of the internal region that is continuous to the contour line from the depth map, using known image filtering e.g., one with morphological operations. The adjuster 30 thereby prepares a depth map 71C with such a region removed (see part (c) in FIG. 14). The adjuster 30 then removes the parts of the contour line 61B, which is illustrated in part (B) in FIG. 14, that overlap with the depth map 71C (see part (c) in FIG. 14). The adjuster 30 thereby extracts the contour line 61C of the part following the external shape of the human body, as a contour line of the clothing image to be output (part (D) in FIG. 14).

The adjuster 30 then extracts the shoulder region corresponding to the shoulders of a human body from each of the clothing image to be output and the subject image (depth map) as a feature region.

There are some cases in which it is difficult for the adjuster 30 to extract a shape following the external shape of a human body (e.g., the contour line of the shoulders) from a clothing image, e.g., when the piece of clothing identified by clothing image to be output is a tank top or a bare top. For such a case, a depth map of the second subject wearing the clothing may be stored in the storage 18 in advance, and the adjuster 30 may calculate the contour line of the shoulder region from the shoulder portions of the second subject.

Descriptions referring back to FIG. 1 will now be continued.

The second calculator 34 calculates a first position of the clothing image with respect to the subject image, the first position being a position where the feature region in the clothing image to be output is matched with the position of the feature region in the subject image acquired by the first acquirer 22.

The second calculator 34 calculates the first position if the determiner 29 described later determines that the subject image acquired by the first acquirer 22 satisfies a predetermined first condition. The determining process performed by the determiner 29 and the determining condition will be described later in detail.

The second calculator 34 retrieves the first position in the subject image (depth map) by applying known template matching to the feature region of the subject image, using the feature region of the clothing image to be output as a template. The second calculator 34 then calculates the position at which a specific region of the clothing image to be output (the shoulder regions in the first embodiment) matches the same region of the subject image (depth map), as a first position.

The first position is represented as the coordinates in the subject image. Specifically, the first position is specified as the center of the feature region in the subject image when the feature region of the subject image is brought to the position matching the feature region of the clothing image to be output. In the first embodiment, the second calculator 34 calculates the center of the feature region of the subject image (shoulder region) in the subject image as the first position.

The third calculator 36 calculates a second position of the clothing image to be output in the subject image. The second position is where a predetermined feature point in the feature region of the clothing image to be output is matched with the feature point in the subject image.

While the second calculator 34 calculates the first position by performing template matching using the feature regions, as described earlier, the third calculator 36 calculates the second position based on the positions of the feature points. The second calculator 34 is therefore capable of calculating the first position more accurately than the third calculator 36. While the accuracy of the second position calculated by the third calculator 36 is lower than that achieved by the second calculator 34, the load of calculating the second position performed by the third calculator 36 is lower than that of the second calculator 34.

The feature point is a position that enables the body type of the first subject who is to try on the clothing to be estimated. The feature point is set in advance with reference to the feature region. For example, the feature point is set to the point at the center of the feature region used by the second calculator 34. In this manner, the feature point is set with reference to the feature region used by the second calculator 34. The feature point is represented in the positional coordinates of the corresponding image.

Because the second calculator 34 uses a shoulder region as a feature region in the first embodiment, in the example explained hereunder, the third calculator 36 sets the center between the shoulders of a human body as the feature point.

Figure 15:
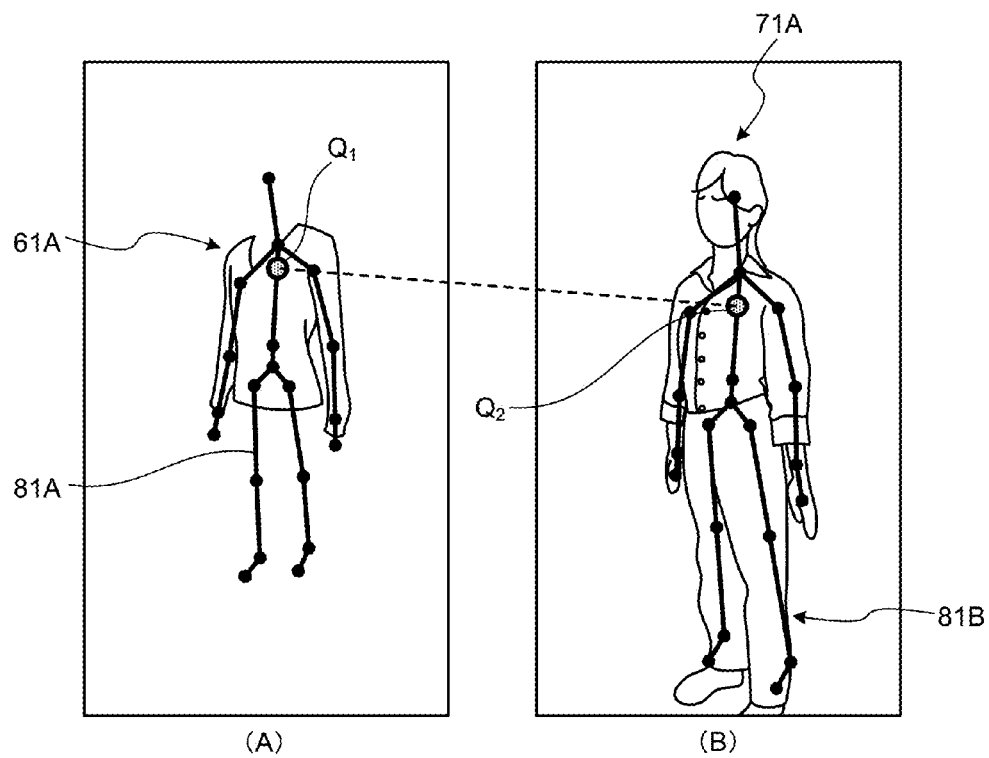
FIG. 15 is a schematic illustrating an exemplary second position calculation.

FIG. 15 is a schematic illustrating an exemplary second position calculation performed by the third calculator 36.

The third calculator 36 calculates, for example, the central position $Q_1$ between the shoulders from skeletal information 81A of the clothing image to be output 61A that is illustrated in part (A) in FIG. 15. The third calculator 36 also calculates the central position $Q_2$ between the shoulders from skeletal information 81B of the subject image 71A illustrated in part (B) in FIG. 15. The third calculator 36 then calculates the second position of the clothing image 61A in the subject image 71A, these images matched in such a manner that the central position $Q_1$ of the shoulders in the clothing image to be output 61A is matched with the central position $Q_2$ of the shoulders in the subject image 71A. In the first embodiment, the third calculator 36 calculates the central position $Q_2$ of the shoulders of the subject image 71A as the second position.

Referring back to FIG. 1, the determiner 29 determines if the subject image acquired by the first acquirer 22 satisfies a first condition having specified in advance.

The first condition is a condition for determining whether the process of calculating the first position is to be performed by the second calculator 34. In other words, the second calculator 34 calculates the first position when the determiner 29 determines that the subject image acquired by the first acquirer 22 satisfies the first condition. The third calculator 36 calculates the second position regardless of whether the determiner 29 determines that the subject image acquired by the first acquirer 22 satisfies the first condition.

Examples of the first condition are provided below. Any one or more of these conditions may be set as the first condition.

An exemplary first condition is whether the first subject who is in the area captured by the imager 14 is replaced by another first subject.

With such a condition, the determiner 29 at first determines whether any person is present within an area at a predetermined distance from the display 20, based on the coordinates of the joints of the first subject in the depth map acquired by the third acquirer 23. If the determiner 29 determines that a person as the first subject is found in the subject image captured at certain time, if the determiner 29 subsequently determines that a person as the first subject is no longer found in the subject image captured at subsequent time, and if the determiner 29 further subsequently determines that a person as the first subject is found in the subject image acquired at further subsequent time, the determiner 29 determines that the person in the area captured by the imager 14 is replaced by another person. Through this process, the determiner 29 determines that the acquired subject image satisfies the first condition set by the determiner 29 in advance.

When the first subject who is positioned in front of the display 20 and who is to try on clothing is replaced, for example, it is preferable for the first position and the second position to be recalculated. Therefore, by setting whether a person in the area captured by the imager 14 is replaced as a condition of the determination of the determiner 29, a superimposed position, which is described later, can be determined more accurately.

If the first position is calculated from a subject image captured while a person positioned in front of the display 20 is moving, the resultant calculation may be less accurate. It is therefore preferable for the determiner 29 to determine whether a subject image satisfies the first condition, if the subject image is acquired after a predetermined time has elapsed from when the person in the area captured by the imager 14 is replaced by another person and the other person is detected to be motionless.

To detect if a person is moving or motionless, known image processing technologies may be used.

Another exemplary first condition is whether a user making an operation instruction on the input unit 16 instructs a clothing ID of another piece of clothing that is different from the piece of clothing included in the synthetic image currently being displayed, as a clothing ID of the piece of clothing to be tried on.

With such a condition, the determiner 29 determines if the subject image acquired by the first acquirer 22 has been acquired immediately after a new clothing ID is instructed by a user making an operation instruction on the input unit 16. If yes, the determiner 29 determines that the acquired subject image satisfies the first condition.

If the first position is calculated from a subject image captured while the first subject who is to try on the clothing is moving in front of the display 20 to make an operation instruction on the input unit 16, the resultant calculation may become less accurate. It is therefore preferable for the determiner 29 to determine whether a subject image satisfies the first condition for a subject image acquired after a predetermined time has elapsed from when it has been determined that an operation instruction has been performed by a user on the input unit 16, and the person is detected to be motionless.

Another exemplary first condition is whether the subject image is acquired by the first acquirer 22 after the first acquirer 22 has acquired a predetermined number of subject images from when the determiner 29 previously determines that the first position is to be calculated from another subject image.

With such a condition, the determiner 29 determines if the subject image is acquired by the first acquirer 22 after the first acquirer 22 has acquired a predetermined number of subject images from when the first acquirer 22 has acquired a subject image previously determined to be a subject image from which the first position is to be calculated. If yes, the determiner 29 determines that the acquired subject image satisfies the first condition.

The predetermined number may be 15 (when the image is a moving image, 15 frames), for example, but the number is not limited to 15. The predetermined number may be set larger when the processing load of the second calculator 34 is high, or when the amount of movement of the first subject is large. These conditions for setting the predetermined number may also be combined.

The determiner 29 may also determine if the subject image acquired by the first acquirer 22 is a subject image acquired after a predetermined time has elapsed from when the first acquirer 22 has acquired a previous subject image determined to be a subject image from which the first position is to be calculated. If yes, the determiner 29 determines that the acquired subject image satisfies the first condition.

For such a condition as well, the determiner 29 may determine the length of the elapsed time based on the amount of movement of the first subject and the processing load of the second calculator 34.

Another exemplary first condition is whether the posture information on the clothing image to be output matches the posture information on the first subject.

With such a condition, the determiner 29 determines if the skeletal information created by the extractor 32 from the subject image acquired by the first acquirer 22 matches the skeletal information included in the posture information on the clothing image to be output and stored in the storage 18. If these pieces of skeletal information match, the determiner 29 determines that the acquired subject image satisfies the first condition.

If the posture of the first subject does not match the posture of the clothing image to be output, it is sometimes difficult for the second calculator 34 to perform the template matching at sufficient accuracy.

It is therefore preferable of the determiner 29 to determine that the acquired subject image satisfies the first condition when the posture information for the clothing image to be output matches the posture of the first subject.

Another exemplary first condition is whether the amount of movement of the first subject is equal to or less than a predetermined amount.

With such a condition, the determiner 29 finds the position of the first subject in the subject image from the coordinates of the joints of the first subject in the depth map acquired by the third acquirer 23. The determiner 29 then calculates the amount of movement of the first subject by comparing the position of the first subject in the previously acquired depth map with the position of the first subject in the depth map acquired this time. If the determiner 29 determines that this amount of movement of the first subject is equal to or less than a predetermined amount, the determiner 29 determines that the acquired subject image satisfies the first condition.

Another exemplary first condition is whether the first subject included in the acquired subject image has his/her arms down.

With such a condition, the determiner 29 determines whether the position corresponding to the arms of the first subject extend toward positions lower than the shoulders (toward the foot) of the first subject, based on the coordinates of the joints of the first subject in the depth map acquired by the third acquirer 23. If the first subject in the acquired depth map has his/her arms down, the determiner 29 determines that the acquired subject image satisfies the predetermined first condition.

If the first subject is in a posture with his/her arms up, it is quite likely that the posture information on the first subject is different from the posture information on the clothing image to be output. If the second calculator 34 performs the template matching with a subject image including a first subject in such a posture, the resultant template matching may become less accurate. It is therefore preferable for the determiner 29 to determine that the acquired subject image satisfies the predetermined first condition when the first subject in the subject image has his/her arms down.

The decider 38 will now be explained.

When the determiner 29 determines that the subject image acquired by the first acquirer 22 satisfies the first condition, the decider 38 determines the first position calculated by the second calculator 34 to be a position where the clothing image to be output is superimposed on the subject image.

If the determiner 29 determines that the subject image acquired by the first acquirer 22 does not satisfy the first condition, the decider 38 determines the superimposed position based on the difference between the first position calculated from a subject image having acquired previously to the subject image acquired this time, and the second position calculated from the same previous subject image by the third calculator 36.

Specifically, if the determiner 29 determines that the subject image acquired by the first acquirer 22 does not satisfy the first condition, the decider 38 determines a superimposed position by offsetting the second position calculated from the subject image by the third calculator 36 by a distance that is based on the difference.

In other words, if the first condition is satisfied by a subject image acquired by the first acquirer 22 previously to the subject image acquired this time, the difference between the first position calculated from the previous subject image by the second calculator 34 and the second position calculated from the previous subject image by the third calculator 36 is used as the difference.

The generator 40 generates a synthetic image by superimposing the identified clothing image to be output on the subject image acquired this time, at the superimposed position determined by the decider 38.

Specifically, the generator 40 superimposes the clothing image to be output on the subject image acquired by the first acquirer 22 at the superimposed position. In this manner, the generator 40 generates the synthetic image.

Specifically, the generator 40 refers to the color value (Cr, Cg, Cb) and the alpha value (a) defined for each of the pixels making up the clothing image identified by the identifier 28 and adjusted by the adjuster 30. An alpha value a is a value equal to or more than zero and equal to or less than one. The generator 40 also refers to the color value (Ir, Ig, Ib) of the corresponding pixel making up the subject image of the first subject. The generator 40 then generates a synthetic image by determining a pixel value (a color value and an alpha value) of the pixel at the corresponding position, with Equation (4) below.

When the clothing image occupies only a part of the entire subject image of the first subject, the following calculation is performed by setting an alpha value of "zero" (a=0) to the area outside of the clothing image.

$$Ox=(1-a)\times Ix+a\times Cx \quad (4)$$

In Equation (4), x represents r, g, or b.

Alternatively, the image processing apparatus 12 may not include the second calculator 34, the third calculator 36, and the decider 38.

Figure 16:
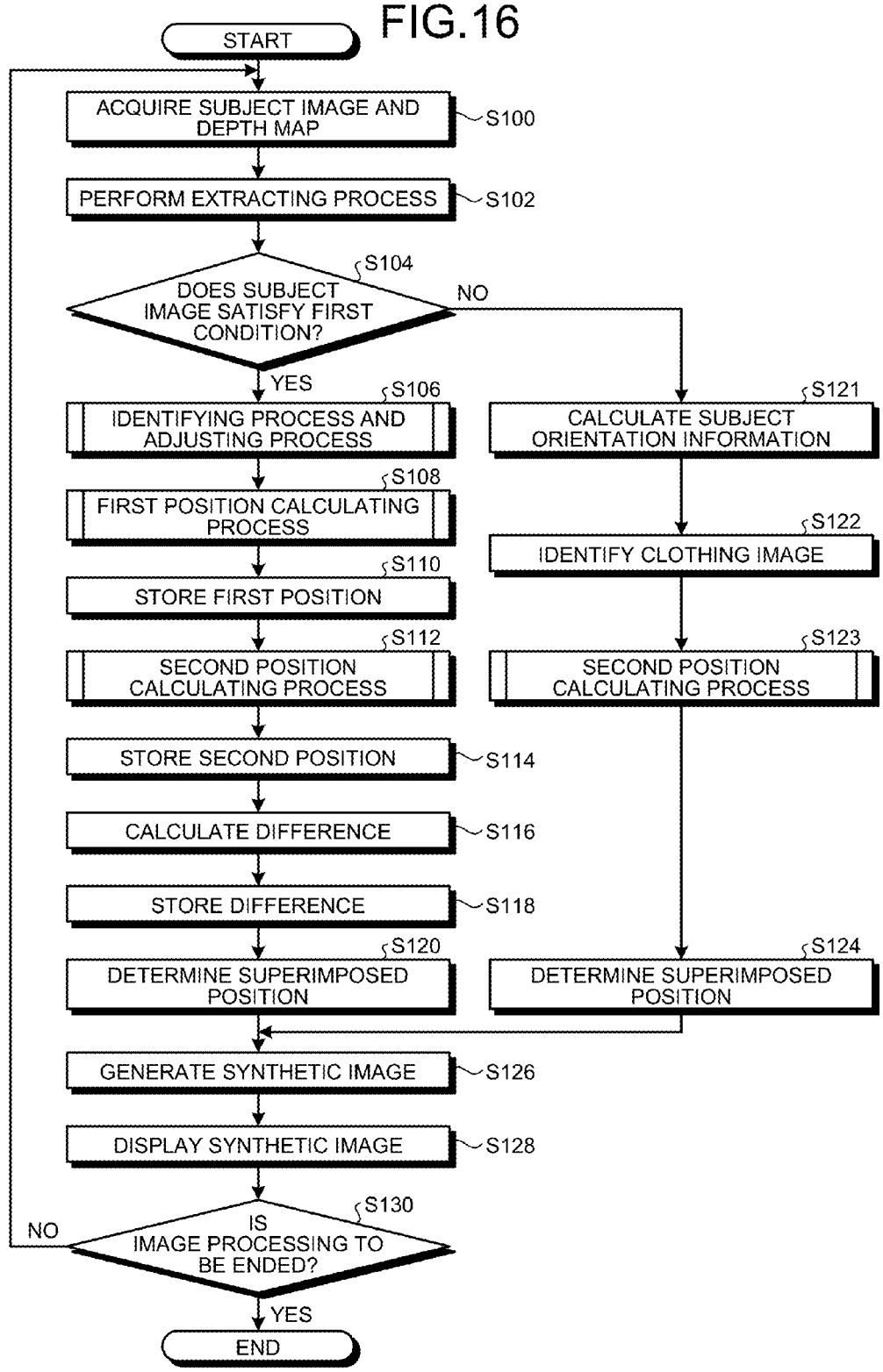
FIG. 16 is a flowchart of image processing.

Without these units, when the receiver 24 receives a clothing ID from the input unit 16, for example, the display controller 42 displays the contour line of the clothing image associated with predetermined one of the clothing sizes of the piece of clothing identified by the received clothing ID, a predetermined one of the second body type parameters, and a predetermined piece of the posture information (e.g., "front side") on the display 20. The first subject then moves the position of his/her body in such a manner his/her body matches the displayed contour line, while looking at the display 20. When a signal instructing to start capturing images is received via the input unit 16 while the body of the first object is matching the contour line, the process described below and illustrated in FIG. 16 is executed.

The generator 40 may also display the contour line of the identified clothing image to be output on the display 20 before executing the synthesizing process. The first subject then adjusts his/her body while looking at the contour line displayed on the display 20 so that his/her position and the posture matches the contour line, and enters a display instruction via the input unit 16. Once the receiver 24 receives the display instruction, the generator 40 generates a synthetic image of the identified clothing image to be output and the subject image acquired by the first acquirer 22, without adjusting the position between these two. The display controller 42 then displays the synthetic image on the display 20.

The generator 40 may also display the identified clothing image to be output on the display 20 before executing the synthesizing process. The first subject adjust his/her body while looking at the clothing image displayed on the display 20 so that his/her position and the posture matches the clothing image, and enters a display instruction via the input unit 16. Once the receiver 24 receives the display instruction, the generator 40 generates a synthetic image of the identified clothing image to be output and the subject image acquired by the first acquirer 22, without adjusting the position between these two. The display controller 42 then displays the synthetic image on the display 20.

At this time, at least one of the size of the clothing image to be output and the size of the subject image may be enlarged or reduced, based on the user making an operation instruction on the input unit 16.

The image processing performed by the image processing apparatus 12 according to the first embodiment will now be explained.

FIG. 16 is a flowchart of the image processing performed by the image processing apparatus 12 according to the first embodiment.

Every time a subject image and a depth map are received from the imager 14, the image processing apparatus 12 performs the process at Steps S100 to S130. When received from the imager 14 are moving images each consisting of a plurality of frames, the image processing apparatus 12 performs the process at Steps S100 to S130 for each of the frames.

To begin with, the first acquirer 22 acquires the subject image, and the third acquirer 23 acquires the depth map (Step S100).

The extractor 32 then performs the extracting process (Step S102). Specifically, at Step S102, the extractor 32 generates skeletal information from the depth map acquired at Step S100. In the first embodiment, the extractor 32 also converts the coordinate system of the skeletal information on the first subject (that is, the coordinate system of the second imager 14B) into the coordinate system of the first imager 14A.

The determiner 29 then determines if the subject image acquired at Step S100 satisfies the first condition (Step S104).

If the determiner 29 determines Yes at Step S104 (Yes at Step S104), the system control goes to Step S106.

At Step S106, the identifying process and the adjusting process are executed (Step S106). At Step S106, the identifier 28 identifies a clothing image to be output. Also at Step S106, the adjuster 30 enlarges or reduces the size of at least one of the clothing image to be output and the subject image so that at least a part of the contour line of the clothing image matches at least a part of the contour line of the subject image. The adjuster 30 also extracts a feature region to be used in the second calculator 34 from each of the enlarged or reduced clothing image and the enlarged or reduced subject image.

The identifying process and the adjusting process performed at Step S106 will be described later in detail.

The second calculator 34 performs the first position calculating process (Step S108). At Step S108, the second calculator 34 calculates the first position of the clothing image in the subject image, the first position being where the position of the feature region in the clothing image to be output extracted at Step S106 matches the position of the feature region in the subject image acquired at Step S100. The first position calculating process performed at Step S108 will be described later in detail.

The second calculator 34 then stores the calculated first position in the storage 18, in a manner associated with a piece of information capable of identifying the subject image acquired at Step S100 (Step S110). The information capable of identifying the subject image may be the date and the time at which the subject image is acquired, for example.

The third calculator 36 then performs the second position calculating process (Step S112). At Step S112, the third calculator 36 calculates the second position of the clothing image with respect to the subject image, the second position being where the position of the feature point in the clothing image to be output matches the position of the feature point in the subject image. The second position calculating process will be described later in detail.

The third calculator 36 then stores the calculated second position in the storage 18, in a manner associated with a piece of information capable of identifying the subject image acquired at Step S100 (Step S114). The piece of information capable of identifying the subject image may be the same information used at Step S110.

The decider 38 then reads the first position calculated at Step S108 and the second position calculated at Step S112 from the storage 18, and calculates the difference between the first and the second positions (Step S116). The decider 38 then stores the calculated difference in the storage 18, in a manner associated with the same piece of information capable of identifying the subject image, as that used at Steps S110 and S114 (Step S118).

When a difference between the first position and the second position is already stored in the storage 18, the decider 38 may overwrite the existing difference with the difference newly calculated at Step S116. The decider 38 may store only the latest difference in the storage 18.

The decider 38 then determines the superimposed position (Step S120). At Step S120, the decider 38 determines the first position calculated at Step S108 to be the position where the clothing image to be output is superimposed on the subject image acquired at Step S100. The system control then goes to Step S126 described later.

In the image processing apparatus 12, as a result of the process from Step S104 to Step S120, when the determiner 29 determines that subject image acquired at Step S100 satisfies the first condition, the first position calculated by the second calculator 34 is determined as the position at which the clothing image to be output is superimposed on the subject image.

If the determiner determines No at Step S104 (No at Step S104), the system control goes to Step S121. At Step S121, the first calculator 33 calculates the posture information on the first subject (Step S121).

The identifier 28 then identifies a clothing image associated with a second body type parameter of which dissimilarity with the estimated first body type parameter is equal to or lower than the threshold, and to the posture information calculated at Step S204, from the clothing images associated with the received clothing ID in the first information stored in the storage 18 (Step S122).

The third calculator 36 executes the second position calculating process, in the same manner as at Step S112 (details are described later) (Step S123).

The decider 38 then determines the superimposed position (Step S124).

Specifically, the decider 38 reads a difference between the first position calculated from the subject image acquired previously to the subject image acquired this time, and the second position calculated from the subject image used in calculating the first position, the first and the second position being calculated by the second calculator 34 and by the third calculator 36, respectively. The difference is read from the storage 18. The decider 38 reads the latest one of the differences stored in the storage 18 (that is, the difference calculated immediately previously). The decider 38 then determines a superimposed position by offsetting the second position calculated from the subject image acquired this time at Step S123 by a distance that is based on the difference read from the storage 18.

The second position is offset in a direction in parallel with a direction vector having the starting point at the second position previously calculated by the third calculator 36 and the ending point at the first position previously calculated by the second calculator 34. The system control then goes to Step S126.

The generator 40 then generates a synthetic image (Step S126). At Step S126, the generator 40 generates the synthetic image by superimposing the clothing image to be output identified at Step S106 and of which size is enlarged or reduced correspondingly to the subject image on the subject image of the subject acquired at Step S100, at the superimposed position.

The display controller 42 then performs the control of displaying the synthetic image generated at Step S128 on the display 20 (Step S128).

The image processing apparatus 12 then determines if the image processing is to be ended (Step S130). The image processing apparatus 12 makes this determination based on, for example, whether a signal indicating an end instruction is received, via an operation of an end instruction button, not illustrated, of the image processing apparatus 12 operated by a user instructing operation.

If the image processing apparatus 12 determines No at Step S130 (No at Step S130), the system control returns to Step S100. If the image processing apparatus 12 determines Yes at Step S130 (Yes at Step S130), the routine is ended.

The identifying process and the adjusting process at Step S106 will now be explained.

Figure 17:
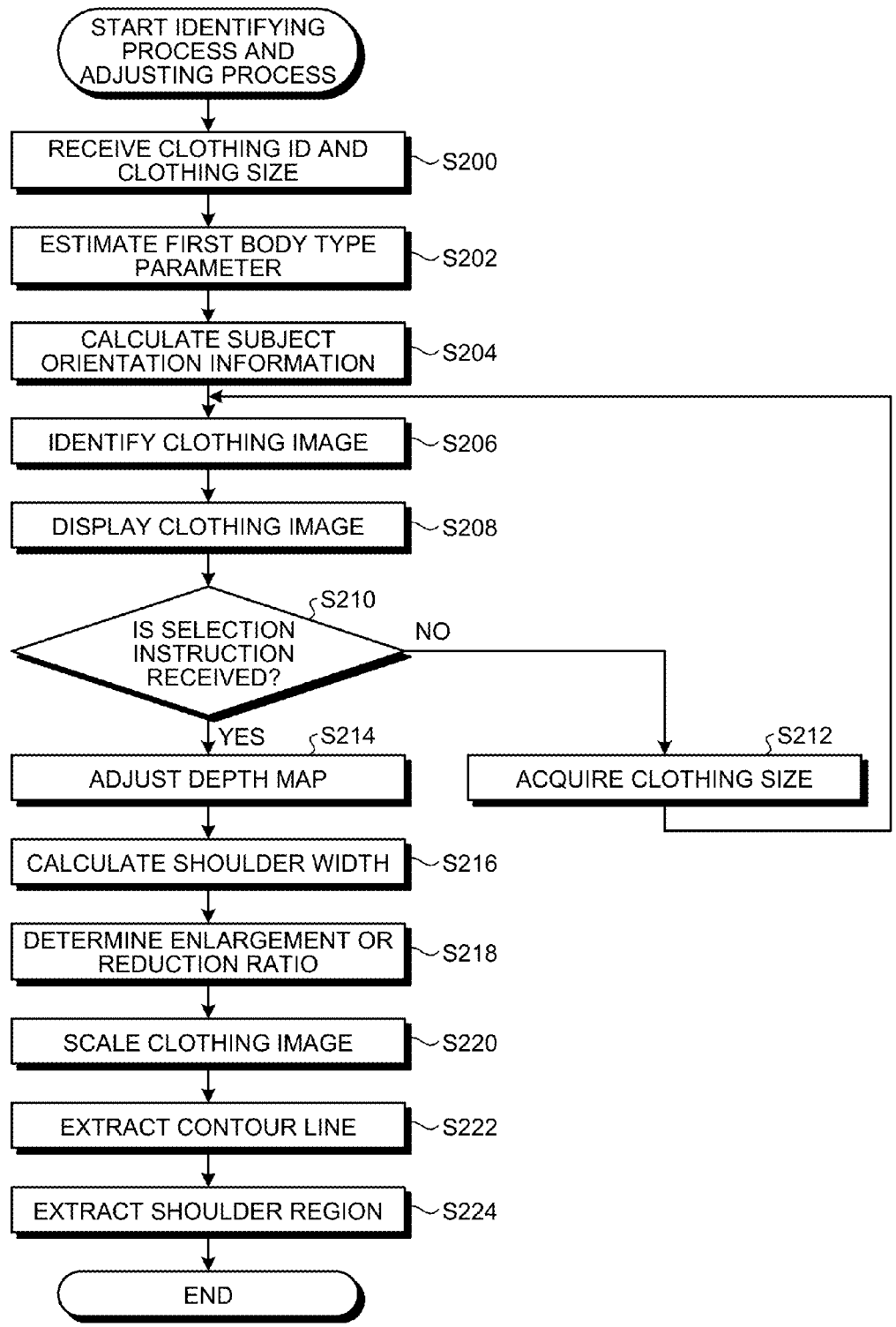
FIG. 17 is a flowchart of an identifying process and an adjusting process.

FIG. 17 is a flowchart of the identifying process and the adjusting process.

To begin with, the receiver 24 receives the clothing ID and the clothing size of the piece of clothing to be tried on from the input unit 16 (Step S200).

The process of receiving the clothing ID and the clothing size at Step S200 may be performed before Step S100 (FIG. 16).

The estimator 27 then estimates the first body type parameter of the first subject from the depth map acquired from the third acquirer 23 at Step S100 (Step S202). When the fourth acquirer 26 acquires the weight from the weight measurer 19, the estimator 27 estimates first body type parameters including the acquired weight and parameters estimated from the depth map.

Because the identifier 28 identifies a clothing image taking posture information into consideration in the example illustrated in FIG. 17, the first calculator 33 calculates the posture information on the first subject (Step S204). The identifier 28 may identify a clothing image without taking the posture information into consideration, as mentioned earlier.

The identifier 28 then identifies a clothing image associated with a second body type parameter of which dissimilarity with the estimated first body type parameter is equal to or lower than the threshold, and to the posture information calculated at Step S204, from the clothing images associated with the received clothing ID in the first information stored in the storage 18 (Step S206).

The display controller 42 then displays the identified clothing image on the display 20 (Step S208). The receiver 24 then determines if a selecting instruction issued by a user is received from the input unit 16 (Step S210). If the receiver 24 determines Yes at Step S210 (Yes at Step S210), the identifier 28 identifies the clothing image for which a selection is instructed as an image to be synthesized. The system control then goes to Step S214.

If the receiver 24 determines No at Step S210 (No at Step S210), the receiver 24 acquires a clothing size from the input unit 16 (Step S212). The system control then returns to Step S206. Alternatively, the system control may return to Step S100 (see FIG. 16) after the process at Step S212. At Step S212, the receiver 24 may acquire the clothing ID as well as the clothing size from the input unit 16. In such a case, the system control returns to Step S200 after the process at Step S212.

Through the process from Step S200 to Step S212, the identifier 28 identifies a clothing image to be output.

The adjuster 30 then adjusts the depth map acquired by the third acquirer 23 (Step S214). Specifically, the adjuster 30 converts the coordinate system of the pixels making up the depth map of the first subject (the coordinate system of the second imager 14B) into the coordinate system of the first imager 14A. The adjuster 30 then adjusts the resolution of the depth map of the first subject to the same resolution of the subject image of the first subject, by projecting the pixel at each pixel position of the depth map of the first subject applied with the coordinate conversion to the corresponding pixel position in the subject image of the first subject captured at the same timing.

The adjuster 30 then calculates the size of the feature region in the clothing image to be output identified in the process from Step S200 to Step S212, and the size of the feature region in the subject image (Step S216). In the first embodiment, because the shoulder region is used as a feature region, as mentioned earlier, the adjuster 30 calculates the shoulder width in the identified clothing image to be output and the shoulder width in the subject image acquired at Step S100 (see FIG. 16).

The adjuster 30 then determines a ratio (enlargement or reduction ratio) at which the clothing image to be output is scaled based on the sizes of the feature regions calculated at Step S216, that is, the shoulder width in the clothing image and the shoulder width in the subject image (Step S218).

The adjuster 30 then scales (enlarges or reduces) the size of the clothing image to be output identified in the process from Step S200 to Step S212 at the enlargement or reduction ratio identified by the scaling ratio determined at Step S218 (Step S220). Similarly, the adjuster 30 also enlarges or reduces the size of the skeletal information included in the posture information on the clothing image to be output at the enlargement or reduction ratio identified by the same scaling ratio.

The adjuster 30 then extracts the feature region from the clothing image to be output of which size is enlarged or reduced at Step S220, and the feature region from the subject image acquired at Step S100 (see FIG. 16).

To begin with, the adjuster 30 extracts a contour line from the clothing image to be output of which is size is enlarged or reduced at Step S220, and a contour line from the subject image acquired at Step S100 (see FIG. 16) (Step S222). The adjuster 30 then extracts the shoulder region from the contour line of the clothing image, and the shoulder region from the contour line of the subject image (Step S224). The routine is then ended.

Explained above is an example in which the adjuster 30 determines the ratio (enlargement or reduction ratio) at which the clothing image is scaled at Step S218, and the clothing image is scaled at the enlargement or reduction ratio identified by the scaling ratio. However, the adjuster 30 may determine the enlargement or reduction ratio for at least one of the clothing image and the subject image, the ratio allowing at least part of the contour line in the clothing image to match at least part of the contour line of the subject image. Alternatively, the subject image may be scaled to an inverse of the enlargement or reduction ratio determined for the clothing image.

By performing the process from Step S214 to Step S224, the adjuster 30 enlarges or reduces the size of at least one of the clothing image and the subject image so that at least a part of the contour line of the clothing image to be output matches at least a part of the contour line of the subject image. The adjuster 30 then extracts the shoulder region from the enlarged or reduced clothing image, and the shoulder region from the enlarged or reduced subject image, as feature regions.

The first position calculating process performed by the second calculator 34 at Step S108 in FIG. 16 will now be explained.

Figure 18:
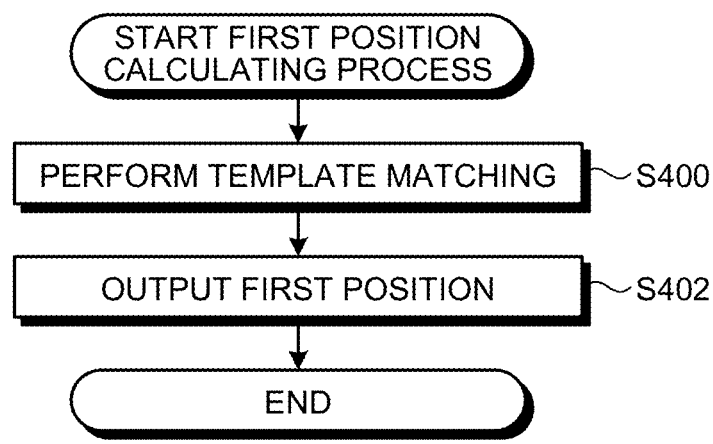
FIG. 18 is a flowchart of a first position calculating process.

FIG. 18 is a flowchart of the first position calculating process performed by the second calculator 34.

The second calculator 34 performs known template matching using the shoulder region in the subject image and the shoulder region in the clothing image to be output, the regions extracted by the adjuster 30 as feature regions (Step S400). At Step S400, the second calculator 34 retrieves a first position in the depth map of the first subject having adjusted by the adjuster 30, by means of template matching, and calculates the first position in the depth map. The first position is a position where a specific region (shoulder region) in the clothing image to be output matches the same region in the depth map.

The second calculator 34 then outputs the calculated first position to the determiner 29 (Step S402). The routine is then ended.

The second position calculating process performed by the third calculator 36 at Step S112 and Step S123 explained in FIG. 16 will now be explained.

Figure 19:
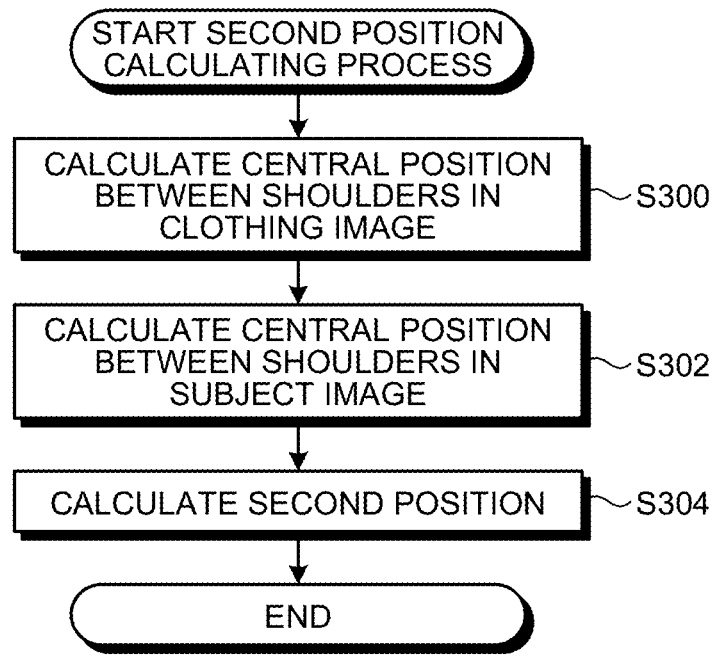
FIG. 19 is a flowchart of a second position calculating process.

FIG. 19 is a flowchart of the second position calculating process performed by the third calculator 36.

To begin with, the third calculator 36 calculates the central position between shoulders in the clothing image to be output, the central position serving as the feature point of the clothing image to be output (Step S300).

The third calculator 36 then calculates the central position between the shoulders in the subject image (Step S302). Specifically, the third calculator 36 calculates the central position between the shoulders of the first subject from the skeletal information on the first subject created at Step S106 (see FIG. 16) by the extractor 32.

The third calculator 36 then calculates the second position where the central position calculated Step S300 matches the central position calculated at Step S302 (Step S304). In the first embodiment, the third calculator 36 calculates the central position between the shoulders of the subject image as the second position, such central position calculated at Step S302.

The routine is then ended.

Figure 20:
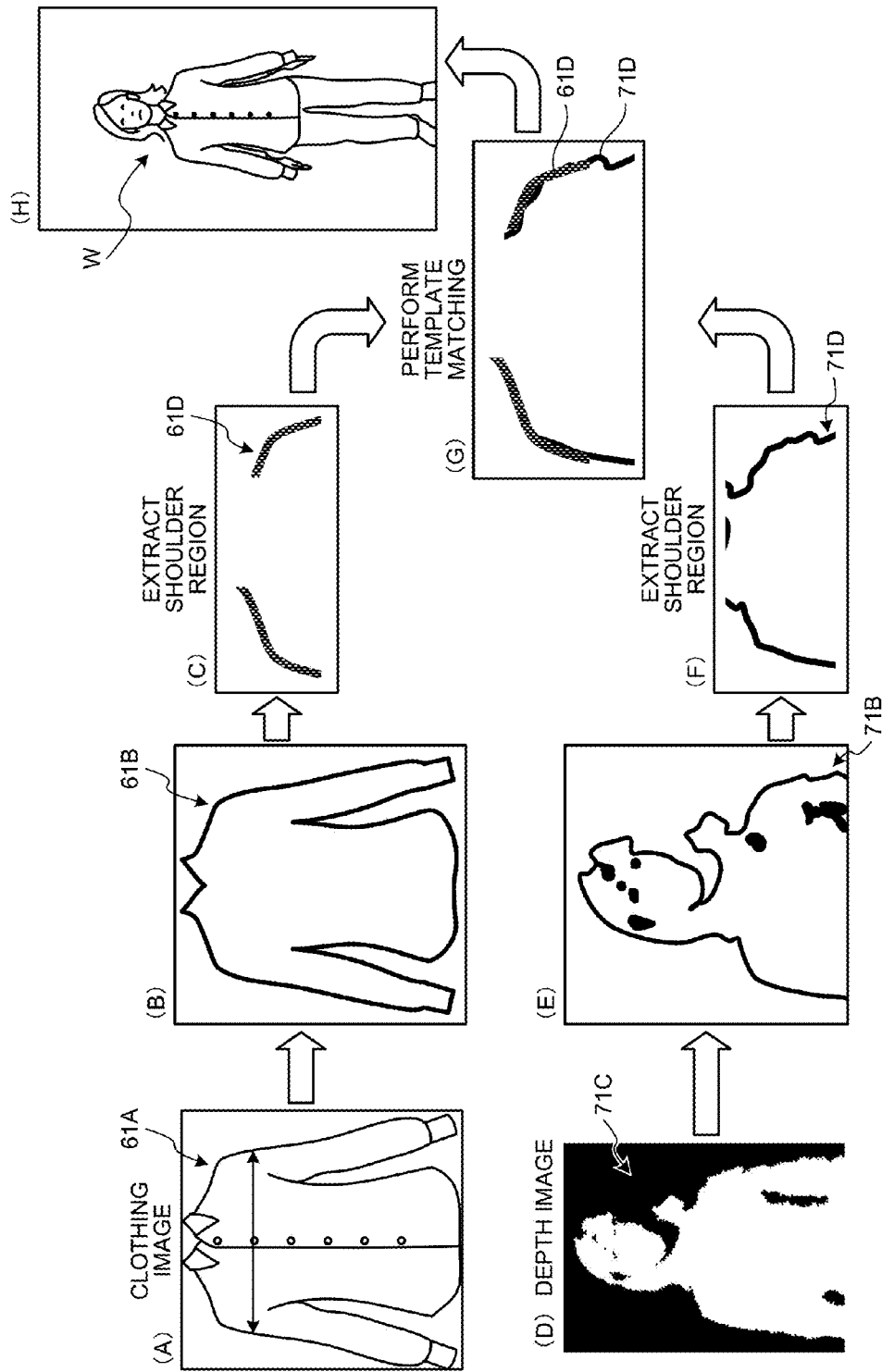
FIG. 20 is a schematic for explaining synthetic image generation.

FIG. 20 is a schematic for explaining the synthetic image generation performed by the image processing apparatus 12 according to the first embodiment.

It is assumed herein that, as an example, the clothing image to be output is the clothing image 61A (see part (A) in FIG. 20), and the depth map of the first subject is a depth map 71C (see part (D) in FIG. 20).

Given these images, the adjuster 30 extracts the contour line 61B of the clothing image 61A through the adjusting process (see part (B) in FIG. 20). The adjuster 30 also extracts a shoulder region 61D as a feature region through the adjusting process (see part (C) in FIG. 20).

The adjuster 30 also extracts a contour line 71B from the depth map 71C of the first subject through the adjusting process (see part (E) in FIG. 20). The adjuster 30 then extracts a shoulder region 71D as a feature region through the adjusting process (see part (F) in FIG. 20).

If the determiner 29 determines that the first condition is satisfied, the second calculator 34 calculates the first position (not illustrated in FIG. 20) by performing the template matching using the shoulder region 61D of the clothing image 61A and the shoulder region 71D of the depth map 71C of the subject (part (G) in FIG. 20). If the first condition is determined to be satisfied, the decider 38 establishes the first position as the superimposed position.

The generator 40 then superimposes the clothing image to be output determined at Step S206 and of which size is enlarged or reduced correspondingly to the subject image on the subject image of the first subject acquired by the first acquirer 22 at the superimposed position. Through this process, the generator 40 generates a synthetic image W (see part (H) in FIG. 20).

The contour line and the feature region of the clothing image may be associated with each of the clothing images in the first information in advance. With such information, the adjuster 30 executes the process described above for each of the clothing images registered in the first information.

As explained above, in the image processing apparatus 12 according to the first embodiment, the first acquirer 22 acquires a subject image of a first subject. The second acquirer 31 acquires a first body type parameter representing the body type of the first subject. The receiver 24 receives a clothing ID of a piece of clothing to be tried on. The first information is a piece of information in which a plurality of clothing sizes, a plurality second body type parameters that are associated with each of the clothing sizes and each of which indicates a different body type, a plurality of clothing images each indicating a second subject whose body type is represented by the corresponding second body type parameter and who is wearing a piece of clothing in the corresponding clothing size are associated with each of the clothing IDs. The identifier 28 identifies a clothing image associated with a second body type parameter of which dissimilarity with the first body type parameters of the first subject is equal to or lower than the threshold as a clothing image to be output, among those associated with the received clothing ID in the first information.

In this manner, the image processing apparatus 12 according to the first embodiment identifies a clothing image representing a second subject whose body type matches or is similar to that of the first subject, wearing a piece of clothing to be tried on designated by a first subject, as a clothing image to be output. The image processing apparatus 12 can therefore provide a clothing image of a piece of clothing to be tried on, based on the body type of the first subject.

The image processing apparatus 12 according to the first embodiment can therefore provide an image of a piece of clothing to be tried on, based on the body type of the first subject.

Conventionally, a clothing image used in a synthesized image has been in a size designated by a user. Therefore, conventionally, a first subject who has a particular body type has been incapable of checking the image of himself/herself trying on a piece of clothing in different sizes that are prepared in advance, as ready-made clothing.

By contrast, the image processing apparatus 12 according to the first embodiment can provide clothing images of a second subject having a body type that matches or is similar to that of the first subject, wearing a piece of clothing in one or more clothing sizes. The image processing apparatus 12 according to the first embodiment can therefore provide an image of a piece of clothing to be tried on, based on the body type of the first subject.

The image processing apparatus 12 according to the first embodiment generates a synthetic image of a clothing image identified as a clothing image to be output, and a subject image of the first subject.

The image processing apparatus 12 according to the first embodiment can therefore provide a synthetic image of a piece of clothing to be tried on, based on the body type of the first subject.

Used in the description above is an example in which the receiver 24 receives one clothing ID as a clothing ID of a piece of clothing to be tried on. However, the receiver 24 may receive a plurality of clothing IDs of respective pieces of clothing to be tried on. Such an example includes when the first subject wishes to wear a plurality of pieces of clothing in a combination.

Given a plurality of clothing IDs, the image processing apparatus 12 can perform the process described above for each of the clothing IDs received by the receiver 24.

Given a plurality of clothing IDs, the image processing apparatus 12 may perform the following process. To begin with, the identifier 28 performs the identifying process for one of the clothing IDs received by the receiver 24, thereby identifying a clothing image to be output corresponding to the clothing ID. For each of the remaining clothing IDs received, the identifier 28 identifies a clothing image associated with the model ID that is associated with the clothing image having already identified, among those associated with the clothing ID.

Explained with reference to FIG. 17 is an example in which the receiver 24 receives a clothing ID and a clothing size from the input unit 16. However, the receiver 24 may receive only the clothing ID, without receiving the clothing size from the input unit 16.

The identifier 28 may then identify, for each of the clothing sizes associated with the clothing ID, a clothing image associated with a second body type parameter of which dissimilarity with the first body type parameters is equal to or less than the threshold. The identifier 28 then may identify a clothing image to be output by narrowing down the clothing images incrementally, e.g., with a selection instruction issued by a user.

The scope in which the image processing apparatus 12 according to the first embodiment can be used is not particularly limited. The image processing apparatus 12 may be provided to, for example, a device installed in a store, or may be internalized in an electronic device such as a mobile terminal, a personal computer, and a television. The image processing apparatus 12 may also be used in an electronic blackboard system (signage system). When the image processing apparatus 12 is to be provided to a device installed in a store, the image processing system 10 including the image processing apparatus 12 may be configured in a manner illustrated in FIG. 2A. When the image processing apparatus 12 is internalized in an electronic device, the image processing system 10 may be configured in a manner illustrated in FIG. 2B.

Second Embodiment

Figure 21:
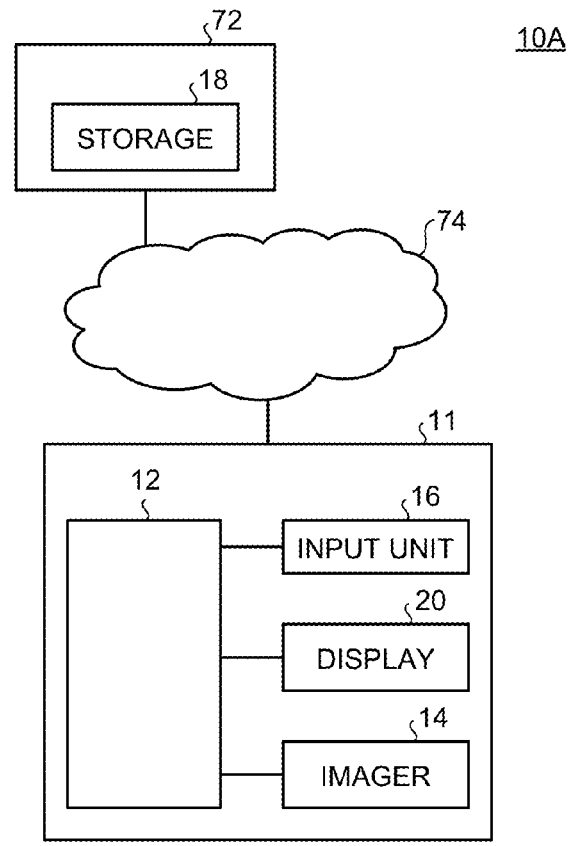
FIG. 21 is a schematic illustrating another image processing system.

FIG. 21 is a schematic illustrating an image processing system 10A.

In the image processing system 10A, a storage device 72 and a processing device 11 are connected over a telecommunication circuit 74.

The storage device 72 is a device including the storage 18 according to the first embodiment, and is a personal computer of a known type, for example. The processing device 11 is a device provided with the image processing apparatus 12, the imager 14, the input unit 16, and the display 20 according to the first embodiment. The functional units that are the same as those in the first embodiment are assigned with the same reference numerals, and detailed explanations thereof are omitted hereunder. The telecommunication circuit 74 is a telecommunication circuit such as the Internet, and of which example includes a wired telecommunication circuit and a wireless telecommunication circuit.

The storage 18 is provided to the storage device 72 connected to the processing device 11 over the telecommunication circuit 74, as illustrated in FIG. 15, so that a plurality of processing devices 11 can access the same storage 18, and the data stored in the storage 18 can be centrally managed.

The processing device 11 may be deployed in any location. The processing device 11 may be deployed in, for example, locations where the user looks at the synthetic image such as a store. The functions of the processing device 11 may also be provided to a mobile terminal of a known type.

Third Embodiment

Figure 22:
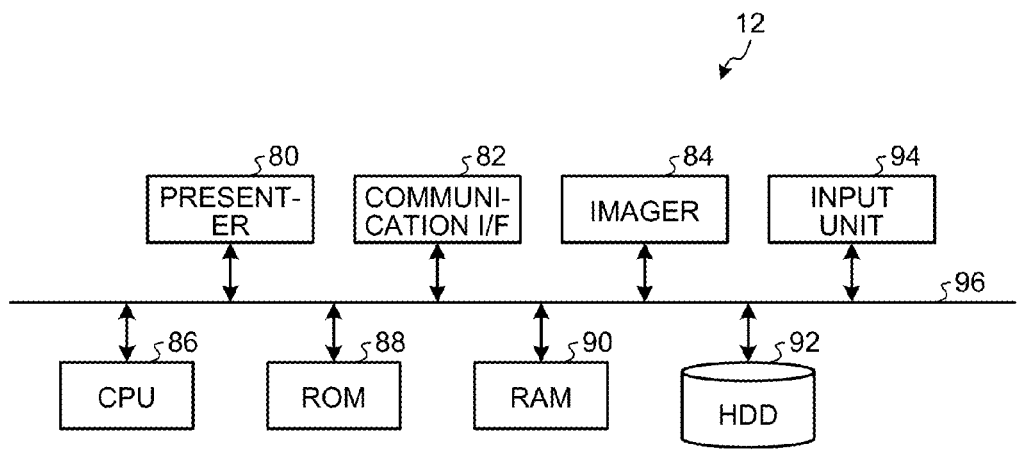
FIG. 22 is a block diagram illustrating an exemplary hardware configuration.

A hardware configuration of the image processing apparatus 12 according to the first and the second embodiments will now be explained. FIG. 22 is a block diagram illustrating an exemplary hardware configuration of the image processing apparatus 12 according to a third embodiment.

The image processing apparatus 12 according to the first and the second embodiments includes a presenter 80, a communication interface (I/F) 82, a imager 84, an input unit 94, a central processing unit (CPU) 86, a read-only memory (ROM) 88, a random access memory (RAM) 90, and a hard disk drive (HDD) 92 connected to each other over a bus 96, and has a hardware configuration implemented as a general computer.

The CPU 86 is a processor that controls the entire process performed by the image processing apparatus 12. The RAM 90 stores therein data required in various processes performed by the CPU 86. The ROM 88 stores therein computer programs or the like implementing various processes performed by the CPU 86. The HDD 92 stores therein data to be stored in the storage 18. The communication I/F 82 is an interface for establishing a connection to an external device or an external terminal over a telecommunication circuit, for example, and exchanging data with the connected external device or external terminal. The presenter 80 corresponds to the display 20 described above. The imager 84 corresponds to the imager 14 described above. The input unit 94 corresponds to the input unit 16 described above.

The computer program for implementing the various processes executed by the image processing apparatus 12 according to the first and the second embodiments is embedded and provided in the ROM 88, for example.

The computer program executed according to the first and the second embodiment may be recorded and provided in a computer-readable recording medium such as a compact disc read only memory (CD-ROM), a flexible disk (FD), a compact disc recordable (CD-R), and a digital versatile disc (DVD), as a file that can be installed to and executed on such a device.

The computer program executed according to the first and the second embodiment may be stored in a computer connected to a network such as the Internet and made available for a download over the network. The computer program for implementing the various processes performed by the image processing apparatus 12 according to the first and the second embodiments may be provided or distributed over a network such as the Internet.

The computer program for implementing the various processes according to the first and the second embodiments generates the units described above on the main memory.

Various types of information stored in the HDD 92, that is, the various types of information stored in the storage 18 may also be stored in an external device (such as a server). In such a configuration, the external device and the CPU 86 may connect to each other over a network, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
   a first acquirer configured to acquire a subject image of a first subject;
   a second acquirer configured to acquire a first body type parameter representing a body type of the first subject;
   a receiver configured to receive identification information on a piece of clothing to be tried on; and
   an identifier configured to identify, as a clothing image to be output, a clothing image associated with a second body type parameter of which dissimilarity with the first body type parameter is equal to or lower than a threshold, from among a plurality of clothing images associated with the received identification information in first information in which a plurality of clothing sizes, a plurality of second body type parameters, and a plurality of clothing images are associated with each of pieces of identification information on pieces of clothing, the second body type parameters corresponding to each of the clothing sizes and representing different body types, and the clothing images each being captured when a second subject who has a body type represented by the corresponding second body type parameter that is associated with the corresponding clothing size is actually wearing the piece of clothing in each of the clothing sizes.

2. The apparatus according to claim 1, wherein
   the receiver is configured to receive a size of a piece of clothing to be tried on in addition to the identification information, and
   the identifier is configured to identify a clothing image associated with a second body type parameter of which dissimilarity with the first body type parameter is equal to or lower than the threshold, from among the clothing images associated with the received identification information and the received clothing size in the first information.

3. The apparatus according to claim 1, wherein the second acquirer comprises:
   a third acquirer configured to acquire a depth map of the first subject; and
   an estimator configured to estimate the first body type parameter from the depth map.

4. The apparatus according to claim 3, wherein the estimator is configured to correct the first body type parameter to a smaller value when a degree by which a body is hidden by a piece of clothing identified by the identification information is higher.

5. The apparatus according to claim 1, wherein the first body type parameter and the second body type parameter include, as a parameter, at least one or more measurements of location of a human body or a weight of a human body.

6. The apparatus according to claim 5, wherein the estimator is configured to estimate the measurements based on distances of regions corresponding to the respective parameters in three-dimensional model data of a human body applied to a depth map of the first subject and to a depth map of the second subject.

7. The apparatus according to claim 1, wherein
the first body type parameter and the second body type parameter include, as parameters, at least one or more measurements of locations of a human body or a weight of a human body, and
the identifier is configured to calculate the dissimilarity based on a weighting value in second information in which each of the parameters is associated with a weighting value used in calculating the dissimilarity.

8. The apparatus according to claim 7, wherein the estimator is configured to estimate the measurements based on distances of regions corresponding to the respective parameters in three-dimensional model data of a human body applied to a depth map of the first subject and to a depth map of the second subject.

9. The apparatus according to claim 1, further comprising a generator configured to generate a synthesized image of the subject image and the identified clothing image.

10. The apparatus according to claim 9, further comprising a display controller configured to display at least one of the identified clothing image and the synthesized image on a display.

11. The apparatus according to claim 1, wherein
the receiver is configured to receive a selection instruction of the clothing image to be output from an input unit that receives a user input, and
the identifier is configured to identify a clothing image for which the selection instruction is received from the input unit, from among the clothing images associated with a second body type parameter of which dissimilarity with the first body type parameter is equal to or lower than the threshold in the first information.

12. The apparatus according to claim 1, further comprising storage configured to store therein the first information.

13. An image processing system comprising:
an image processing apparatus; and
an external device connected to the image processing apparatus over a network, wherein
the image processing apparatus comprises:
a first acquirer configured to acquire a subject image of a first subject;
a second acquirer configured to acquire a first body type parameter representing a body type of the first subject;
a receiver configured to receive identification information on a piece of clothing to be tried on; and
an identifier configured to identify, as a clothing image to be output, a clothing image associated with a second body type parameter of which dissimilarity with the first body type parameter is equal to or lower than a threshold, from among a plurality of clothing images associated with the received identification information in first information in which a plurality of clothing sizes, a plurality of second body type parameters, and a plurality of clothing images are associated with each of pieces of identification information on pieces of clothing, the second body type parameters corresponding to each of the clothing sizes and representing different body types, and the clothing images each being captured when a second subject who has a body type represented by the corresponding second body type parameter that is associated with the corresponding clothing size is actually wearing the piece of clothing in each of the clothing sizes, wherein
the external device comprises storage configured to store therein the first information.

14. An image processing method comprising:
acquiring a subject image of a first subject;
acquiring a first body type parameter representing a body type of the first subject;
receiving identification information on a piece of clothing to be tried on; and
identifying, as a clothing image to be output, a clothing image associated with a second body type parameter of which dissimilarity with the first body type parameter is equal to or lower than a threshold, from among a plurality of clothing images associated with the received identification information in first information in which a plurality of clothing sizes, a plurality of second body type parameters, and a plurality of clothing images are associated with each of pieces of identification information on pieces of clothing, the second body type parameters corresponding to each of the clothing sizes and representing different body types, and the clothing images each being captured when a second subject who has a body type represented by the corresponding second body type parameter that is associated with the corresponding clothing size is actually wearing the piece of clothing in each of the clothing sizes.

15. The method according to claim 14, wherein
the receiving comprises receiving a size of a piece of clothing to be tried on in addition to the identification information, and
the identifying comprises identifying a clothing image associated with a second body type parameter of which dissimilarity with the first body type parameter is equal to or lower than the threshold, from among the clothing images associated with the received identification information and the received clothing size in the first information.

16. The method according to claim 14, wherein
the acquiring of the first body type parameter comprises:
acquiring a depth map of the first subject; and
estimating the first body type parameter from the depth map.

17. The method according to claim 16, wherein the estimating comprises correcting the first body type parameter to a smaller value when a degree by which a body is hidden by a piece of clothing identified by the identification information is higher.

18. The method according to claim 14, wherein the first body type parameter and the second body type parameter include, as a parameter, one or more measurements of locations of a human body or a weight of a human body.

19. The method according to claim 18, wherein
the measurements are estimated based on distances of regions corresponding to the respective parameters in three-dimensional model data of a human body applied to a depth map of the first subject and to a depth map of the second subject.

20. The method according to claim 14, wherein the first body type parameter and the second body type parameter include, as parameters, one or more measurements of locations of a human body or a weight of a human body, and the identifying comprises calculating the dissimilarity based on a weighting value in second information in which each of the parameters is associated with a weighting value used in calculating the dissimilarity.

* * * * *